United States Patent
Guturi et al.

(10) Patent No.: US 10,810,035 B2
(45) Date of Patent: Oct. 20, 2020

(54) DEPLOYING A CLOUD INSTANCE OF A USER VIRTUAL MACHINE

(71) Applicant: Cohesity, Inc., San Jose, CA (US)

(72) Inventors: Venkata Ranga Radhanikanth Guturi, San Jose, CA (US); Tushar Mahata, Cupertino, CA (US); Praveen Kumar Yarlagadda, Santa Clara, CA (US); Vipin Gupta, Cupertino, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/287,214

(22) Filed: Feb. 27, 2019

(65) Prior Publication Data

US 2020/0272492 A1  Aug. 27, 2020

(51) Int. Cl.
*G06F 9/455* (2018.01)
*H04L 29/08* (2006.01)

(52) U.S. Cl.
CPC ...... *G06F 9/45558* (2013.01); *H04L 67/1097* (2013.01); *G06F 2009/4557* (2013.01); *G06F 2009/45562* (2013.01); *G06F 2009/45583* (2013.01)

(58) Field of Classification Search
CPC ....... G06F 9/45558; G06F 2009/45562; G06F 2009/4557; G06F 11/07; G06F 11/20; G06F 16/27; G06F 16/322; G06F 16/9027; G06F 16/2246; G06F 16/128; G06F 16/113; G06F 16/188; G06F 16/1873; G06F 16/2372; G06F 16/2379; H04L 67/1034; H04L 67/1097; H04L 41/0668
See application file for complete search history.

(56) References Cited

U.S. PATENT DOCUMENTS

| | | | |
|---|---|---|---|
| 8,086,585 B1 | 12/2011 | Brashers | |
| 9,594,514 B1 | 3/2017 | Bono | |
| 9,983,812 B1* | 5/2018 | Don | G06F 11/0751 |
| 10,496,497 B1* | 12/2019 | Yadav | G06F 11/2064 |
| 10,503,612 B1* | 12/2019 | Wang | G06F 11/1469 |
| 2003/0033344 A1* | 2/2003 | Abbott | G06F 9/4493 718/1 |
| 2006/0182255 A1* | 8/2006 | Luck, Jr. | H04M 3/2254 379/220.01 |

(Continued)

OTHER PUBLICATIONS

Cohesity, Cohesity Data Protection White Paper, 2016, Cohesity, pp. 1-12 (Year: 2016).*

(Continued)

*Primary Examiner* — Emerson C Puente
*Assistant Examiner* — Zhi Chen
(74) *Attorney, Agent, or Firm* — Van Pelt, Yi & James LLP

(57) ABSTRACT

An instruction to generate a cloud instantiation of a secondary storage system is provided. One or more secondary storage clusters are virtually rebuilt in the cloud instantiation of the secondary storage system. A new cloud instance of a user virtual machine is deployed based on at least a portion of data stored in the one or more rebuilt secondary storage clusters of the cloud instantiation of the secondary storage system. A version of at least the portion of the data of the one or more rebuilt secondary storage clusters is provided to a cloud deployment server.

14 Claims, 22 Drawing Sheets

(56) References Cited

U.S. PATENT DOCUMENTS

| | | | |
|---|---|---|---|
| 2007/0153675 A1* | 7/2007 | Baglin | H04W 48/20 370/216 |
| 2010/0070725 A1* | 3/2010 | Prahlad | G06F 11/1453 711/162 |
| 2010/0122248 A1 | 5/2010 | Robinson | |
| 2013/0179481 A1 | 7/2013 | Halevy | |
| 2013/0191347 A1* | 7/2013 | Bensinger | G06F 11/1469 707/649 |
| 2013/0219135 A1* | 8/2013 | Knowles | G06F 9/45558 711/159 |
| 2013/0322335 A1* | 12/2013 | Smith | H04W 92/02 370/328 |
| 2014/0359229 A1* | 12/2014 | Cota-Robles | G06F 9/455 711/143 |
| 2014/0372553 A1 | 12/2014 | Blackburn | |
| 2015/0193487 A1* | 7/2015 | Demidov | G06F 16/2246 707/756 |
| 2015/0278046 A1* | 10/2015 | Zellermayer | G06F 11/1438 714/4.11 |
| 2015/0370502 A1* | 12/2015 | Aron | G06F 3/0626 711/162 |
| 2016/0034356 A1* | 2/2016 | Aron | G06F 16/2246 707/649 |
| 2016/0070714 A1 | 3/2016 | D'Sa | |
| 2017/0123935 A1 | 5/2017 | Pandit | |
| 2017/0185729 A1 | 6/2017 | Boray | |
| 2017/0206212 A1 | 7/2017 | Srivilliputtur Mannarswamy | |
| 2017/0212680 A1* | 7/2017 | Waghulde | G06F 3/0625 |
| 2018/0004764 A1 | 1/2018 | Sudarsanam | |
| 2018/0081766 A1* | 3/2018 | Ghuge | G06F 3/065 |
| 2018/0088973 A1 | 3/2018 | Subhraveti | |
| 2018/0212896 A1* | 7/2018 | Chang | G06F 9/5077 |
| 2019/0132203 A1* | 5/2019 | Wince | G06F 9/44505 |
| 2019/0197020 A1* | 6/2019 | Yap | G06F 16/119 |
| 2019/0215358 A1* | 7/2019 | Kobayashi | G06F 13/00 |
| 2019/0220198 A1* | 7/2019 | Kashi Visvanathan | G06F 3/067 |

OTHER PUBLICATIONS

Gaetan Castlelein, Cohesity SnapFS and SnapTree, Aug. 9, 2017, Cohesity, pp. 1-4 (Year: 2017).*

* cited by examiner

DEPLOYING A CLOUD INSTANCE OF A USER VIRTUAL MACHINE

BACKGROUND OF THE INVENTION

A primary system may be configured to perform a backup snapshot of its file system data to a secondary storage system. The secondary storage system may store the backup snapshot. The primary system may request to restore from the secondary storage system any of the file system data included in the backup snapshot. At some point in time, the secondary storage system may go offline for a period of time. During this period of time, the secondary storage system is unable to perform one or more secondary storage functions for the primary system and the primary system must wait for the secondary storage system to come back online.

BRIEF DESCRIPTION OF THE DRAWINGS

Various embodiments of the invention are disclosed in the following detailed description and the accompanying drawings.

DETAILED DESCRIPTION

Figure 1:
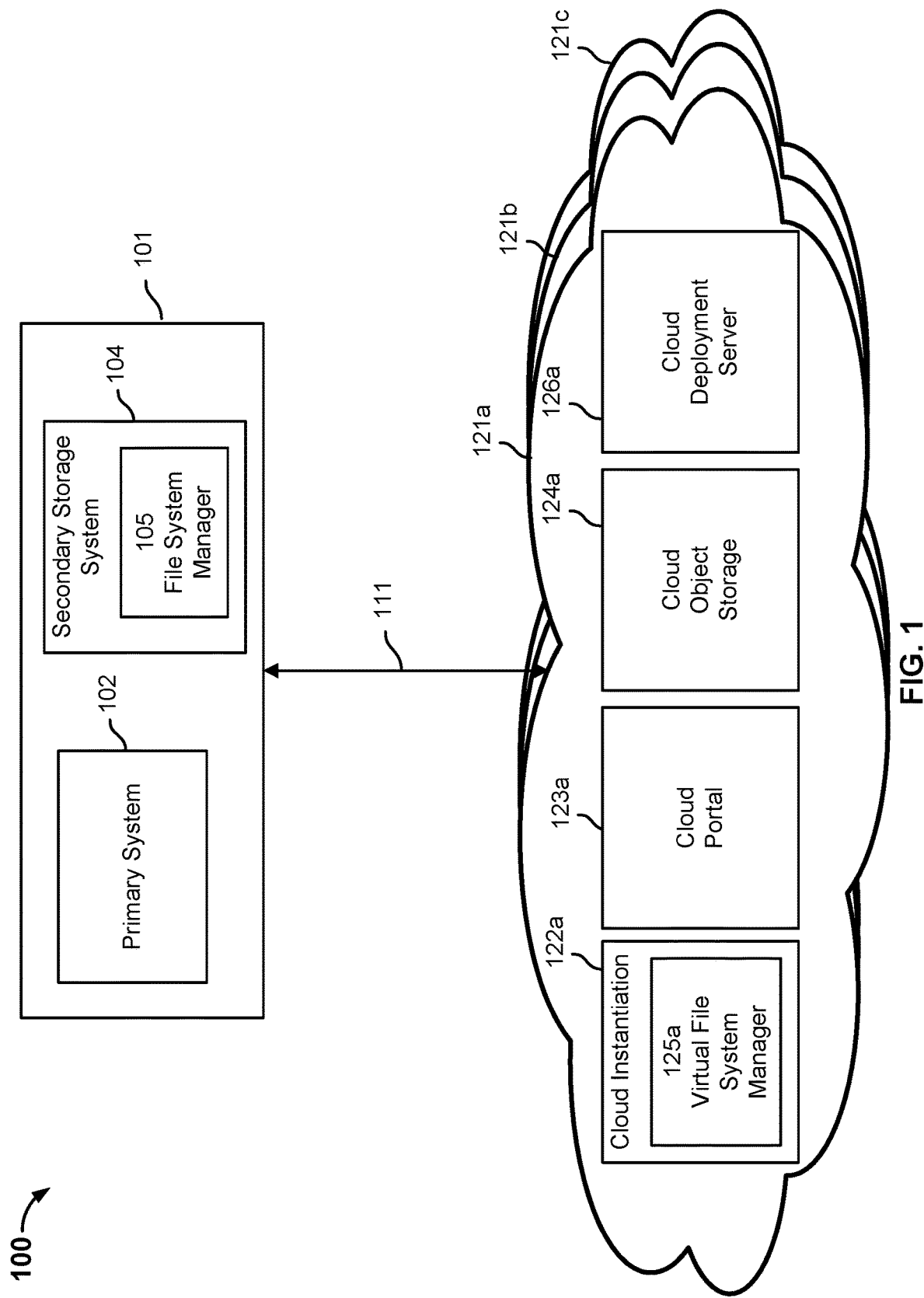
FIG. 1 is a block diagram illustrating an embodiment of a system for deploying a cloud instance of a user virtual machine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A primary system is comprised of file system data. The file system data includes a plurality of files (e.g., content files, text files, etc.) and metadata associated with the plurality of files. The file system data may include data associated with one or more virtual machines. The primary system may perform a backup snapshot of the file system data and send the backup snapshot to a secondary storage system. A backup snapshot represents the state of the primary system at a particular point in time. A backup snapshot may be a full backup snapshot or an incremental backup snapshot. A full backup snapshot includes the entire state of the primary system at a particular point in time. An incremental backup snapshot includes the state of the primary system that has changed since a last backup snapshot.

A secondary storage system may be comprised of a secondary storage cluster that includes a plurality of nodes. The secondary storage system may ingest and store the backup snapshot across the plurality of nodes of the secondary storage cluster. A file system manager associated with the secondary storage system may organize the file system data of the backup snapshot using a tree data structure (e.g., Cohesity Snaptree®). The tree data structure may be comprised of a file system metadata snapshot tree and one or more file metadata trees, which enables a backup snapshot to be a fully hydrated backup snapshot, i.e., a backup snapshot that provides a complete view of the primary system corresponding to a moment in time when the backup snapshot was performed. The file system metadata snapshot tree may be used to capture different versions of the primary system's file system data. For example, a first file system metadata snapshot tree may correspond to a first backup snapshot and a second file system metadata snapshot tree may correspond to a second backup snapshot. The tree data structure may allow a chain of file system metadata snapshot trees (i.e., different file system metadata snapshot tree versions) to be linked together by allowing a node of a later version of a file system metadata snapshot tree to reference a node of a previous version of a file system metadata snapshot tree (e.g., a "file system metadata snapshot tree forest"). For example, a node of the second file system metadata snapshot tree corresponding to the second backup snapshot may reference a node of the first file system metadata snapshot tree corresponding to the first backup snapshot. A file metadata tree may correspond to one of the files included in the backup snapshot. For example, the file metadata tree may correspond to a virtual machine container file. The file metadata tree is a snapshot structure that is configured to store the metadata associated with the file.

A cloud instance of a user virtual machine hosted on the primary system may be generated for one or more reasons. For example, the cloud instance of the user virtual machine may be generated for testing/development purposes. In other embodiments, the user virtual machine hosted on the primary system is offline and the cloud instance of the user virtual machine hosted on the primary system is generated to reduce the amount of downtime associated with the virtual machine. Conventional systems typically use the primary system to generate a copy of the virtual machine and deploy the virtual machine copy to the cloud. However, such an approach reduces the amount of resources the primary system has to perform one or more other tasks, such as running the virtual machine. Such an approach may not be possible in the event the primary system is offline.

In some embodiments, a cloud instance of the user virtual machine is generated according to a backup policy. The secondary storage system may be used to generate and deploy the cloud instance of the user virtual machine according to the backup policy. In other embodiments, the primary system is configured to perform one or more backup snapshots to a cloud instantiation of the secondary storage system and the cloud instantiation of the secondary storage system is configured to generate and deploy the cloud instance of the user virtual machine according to the backup policy. The cloud instantiation of the secondary storage system may be comprised of a plurality of virtual instances. The cloud instantiation of the secondary storage system may be configured to store file system data of a primary system in a similar manner as an on-premises secondary storage system, but in a cloud environment. The virtual machine running on the primary system may be associated with a first virtual machine format (e.g., VMware). The first virtual machine format may not be compatible with a virtual machine format associated with a cloud environment (e.g., Amazon Web Services, Microsoft Azure, Google Cloud, etc.). The secondary storage system or the cloud instantiation of the secondary storage system may be configured to convert a copy of the virtual machine hosted on the primary system from a first virtual machine format to a second virtual machine format that is compatible with the cloud environment in which the cloud instance of the user virtual machine is to be deployed.

The backup policy may include a schedule that indicates a frequency at which a cloud instance of the user virtual machine is to be generated. For example, the cloud instance of the user virtual machine may be generated each time the primary system performs a backup snapshot to the secondary storage system or to the cloud instantiation of the secondary storage system, on a periodic basis (e.g., hourly, daily, weekly, etc.), or when an amount of data associated with a virtual machine has changed more than a change threshold amount. The cloud instance of the user virtual machine may be maintained in a standby mode in a cloud environment until a deploy condition has been satisfied. For example, a user virtual machine hosted on the primary system may go offline or the primary system may go offline. In the event the deploy condition has been satisfied, the cloud instance of the user virtual machine is deployed and ready to be used by a user associated the primary system virtual machine within a short period of time (e.g., minutes).

In other embodiments, a cloud instance of the user virtual machine is generated in response to a user command (e.g., on-demand). For example, the cloud instance of the user virtual machine may be generated for test/development purposes. A secondary storage system or a cloud instantiation of the secondary storage system may be used to generate and deploy the cloud instance of the user virtual machine.

In other embodiments, the cloud instance of the user virtual machine is generated in response to a determination that the user virtual machine on the primary system is offline. For example, a user associated with the primary system may provide to a secondary storage system or to a cloud instantiation of the secondary storage system a command to generate the cloud instance of the user virtual machine. In response to the command, the secondary storage system or the cloud instantiation of the secondary storage system may be configured to convert a backup of the user virtual machine hosted on the primary system from a first virtual machine format to a second virtual machine format that is compatible with the cloud environment in which the cloud instance of the user virtual machine is to be deployed. The secondary storage system or the cloud instantiation of the secondary system may be further configured to deploy the cloud instance of the user virtual machine to the cloud environment.

In other embodiments, the cloud instance of the user virtual machine is generated in response to a determination that the user virtual machine on the primary system is offline, but the secondary storage system is offline and the cloud instantiation of the secondary storage system has yet to be generated. A cloud object storage may store a snapshot archive that includes data associated with an archived version of the user virtual machine hosted on the primary system. A cloud instantiation of the secondary storage system may be generated, an archived version of the virtual machine may be provided to the cloud instantiation of the secondary storage system, the cloud instantiation of the secondary storage system may be configured to convert the archived version of the user virtual machine from a first format to a second format that is compatible with the cloud environment in which the cloud instance of the user virtual machine is to be deployed, and deploy the cloud instance of the user virtual machine to the cloud environment.

By using a secondary storage system or a cloud instantiation of the secondary storage system to generate a cloud instance of a user virtual machine hosted on a primary system, the cloud instance of the user virtual machine may be generated without affecting a performance of the primary system. Furthermore, regardless of whether the primary system or secondary storage system is online, the cloud instantiation of the secondary storage system may generate a version of the user virtual machine, which reduces the amount of downtime for a user associated with the user virtual machine.

FIG. 1 is a block diagram illustrating an embodiment of a system for deploying a cloud instance of a user virtual machine. In the example shown, system 100 includes datacenter 101 coupled to cloud environment 121a via network connection 111.

Datacenter 101 is comprised of primary system 102 and secondary storage system 104. Primary system 102 is a computing system that stores file system data. The file system data may include a plurality of files (e.g., content files, text files, etc.) and metadata associated with the plurality of files. For example, one of the files may be a virtual machine container file that corresponds to a user virtual machine. Primary system 102 may be comprised of one or more servers, one or more computing devices, one or more storage devices, and/or a combination thereof. Primary system 102 may be configured to send a backup snapshot of file system data to secondary storage system 104 according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with primary system 102. In some embodiments, primary system 102 includes an agent (not shown) that causes primary system 102 to perform a backup snapshot according to the backup snapshot policy. The agent may receive an instruction to perform a backup snapshot from secondary storage system 104.

Secondary storage system 104 is comprised of a secondary storage cluster that includes a plurality of nodes. The plurality of nodes may be comprised of one or more solid state drives, one or more hard disk drives, or a combination thereof. Each node may have its own corresponding processor. Secondary storage system 104 may be configured to ingest a backup snapshot received from primary system 102 and configured to store the data associated with the backup snapshot across the secondary storage cluster.

Secondary storage system 104 may include a file system manager 105 that is configured to organize the file system data of the backup snapshot using a tree data structure. The tree data structure may provide a view of the file system data corresponding to a backup snapshot. The view of the file system data corresponding to the backup snapshot may be comprised of a file system metadata snapshot tree and one or more file metadata trees. The file system metadata snapshot tree is configured to store metadata associated with the file system data. A file metadata tree may correspond to one of the files included in the backup snapshot and store the metadata associated with a file. For example, a file metadata tree may correspond to a virtual machine container file (e.g., virtual machine image file, virtual machine disk file, etc.).

Regardless if the view of the file system data corresponds to a full backup snapshot or an incremental backup snapshot, the view of the file system data corresponding to the backup snapshot provides a fully hydrated backup snapshot that provides a complete view of primary system 102 corresponding to a moment in time when the backup snapshot was performed. A fully hydrated backup is a backup that is ready for use without having to reconstruct a plurality of backups to use it. Conventional systems may reconstruct a backup by starting with a full backup and applying one or more changes associated with one or more incremental backups to the data associated with the full backup. In contrast, any file stored in the storage volume at a particular time and the file's contents, for which there is an associated backup, may be determined from the file system metadata snapshot tree, regardless if the associated backup snapshot was a full backup snapshot or an incremental backup snapshot. Creating an incremental backup snapshot may only include copying data of the storage volume(s) that was not previously backed up. However, the file system metadata snapshot tree corresponding to the incremental backup snapshot provides a complete view of the storage volume(s) at the particular moment in time because it includes references to data of the storage volume that was previously stored. For example, a root node associated with the file system metadata snapshot tree may include one or more references to leaf nodes associated with one or more previous backup snapshots and one or more references to leaf nodes associated with the current backup snapshot. This provides significant savings in the amount of time needed to restore or recover a storage volume and/or a database. In contrast, traditional recovery/restoration methods may require significant time, storage, and computational resources to reconstruct a particular version of a volume or database from a full backup and a series of incremental backups. The view of file system data may allow any file (e.g., a virtual machine container file) that was stored on primary system 102 at the time the corresponding backup snapshot was performed, to be retrieved, restored, or replicated.

A file system metadata snapshot tree includes a root node, one or more levels of one or more intermediate nodes associated with the root node, and one or more leaf nodes associated with an intermediate node of the lowest intermediate level. The root node of a file system metadata snapshot tree includes one or more pointers to one or more intermediate nodes. The root node corresponds to a particular backup snapshot of file system data. Each intermediate node includes one or more pointers to other nodes (e.g., a lower intermediate node or a leaf node). A leaf node of the file system metadata snapshot tree may store data associated with a file for a file that is less than or equal to a limit size (e.g., 256 kB). A leaf node of the file system metadata snapshot tree may be an index node (inode). A leaf node of the file system metadata snapshot tree may store a pointer to a file metadata tree for a file that is greater than the limit size.

A file metadata tree includes a root node, one or more levels of one or more intermediate nodes associated with the root node, and one or more leaf nodes associated with an intermediate node of the lowest intermediate level. A leaf node of a file system metadata snapshot tree may include a pointer to the root node of the file metadata tree. A file metadata tree is similar to a file system metadata snapshot tree, but a leaf node of a file metadata tree includes an identifier of a data brick associated with one or more data chunks of the file or a pointer to the data brick associated with one or more data chunks of the file. For example, a leaf node of a file metadata tree may include a pointer to or an identifier of a data brick associated with one or more data chunks of a virtual machine container file. The location of the data chunks associated with a data brick may be identified using a table stored in a metadata store that matches brick numbers (i.e., a brick identifier) to chunk identifiers (e.g., SHA-1) or the location of the data brick may be identified based on the pointer to the data brick. The brick identifier may be used to identify a corresponding chunk identifier. A file table may associate chunk identifiers (e.g., SHA-1) with chunk files. A chunk file is configured to store a plurality of data chunks. The file table may include associate a location of a chunk identifier with an offset within a chunk file. The identified chunk identifier may be used to identify the chunk file that stores one or more data chunks associated with a file.

Datacenter 101 is coupled to cloud environment 121*a* via network connection 111. Network connection 111 may be one or more of the following: a wired network connection, a wireless network connection, the Internet, an intranet, or any other appropriate communication connection.

Cloud environment 121*a* may correspond to a public cloud (e.g., Amazon Web Services, Microsoft Azure, Google Cloud, etc.). Cloud environment 121*a* may correspond to a private cloud. Cloud environment 121*a* may include a cloud instantiation 122*a* of secondary storage system 104, cloud portal 123*a*, cloud object storage 124*a*, and cloud deployment server 126*a*. There may be a plurality of other cloud environments, e.g., cloud environments 121*b*, 121*c* with their own corresponding cloud instantiations of secondary storage system 104, cloud portal, cloud object storage, and cloud deployment server.

To generate cloud instantiation 122*a* of secondary storage system 104, cloud portal 123*a* may be configured to authenticate a user associated with secondary storage system 104. Cloud portal 123*a* may request the user associated with secondary storage system 104 to provide a credential that indicates the one or more secondary storage systems to which the user is associated. For example, the user may provide a username and password that is associated with an account. Cloud portal 123*a* may store a data structure (e.g., list, table, etc.) that associates one or more secondary storage systems with an account. Cloud portal 123*a* may determine the one or more secondary storage systems associated with a user based on the data structure. Cloud portal 123*a* may provide to a user device a list of one or more secondary storage systems associated with user's account via a user interface associated with cloud portal 123*a*. The user interface associated with cloud portal 123*a* may receive a selection of one of the one or more secondary storage systems associated with the user's account. In response to selection, cloud portal 123*a* may cause a cloud instantiation of selected secondary storage system to be generated.

Cloud instantiation 122*a* of secondary storage system 104 may act as a backup for secondary storage system 104. In other embodiments, cloud instantiation 122*a* of secondary storage system 104 acts as a backup system for primary system 102. In other embodiments, cloud instantiation 122*a* of secondary storage system 104 is used to deploy a cloud instance of a user virtual machine in the event primary system 102 (the system that hosts the user virtual machine) or secondary storage system 104 is offline. Cloud instantiation 122*a* of secondary storage system 104 may use an archived version of the user virtual machine to generate the cloud instance of the user virtual machine.

Secondary storage system 104 is comprised of a secondary storage cluster that is comprised of a plurality of nodes. Each node of the secondary storage cluster has a particular storage capacity. Cloud portal 123*a* may be configured to cause cloud instantiation 122*a* of secondary storage system 104 to have the same storage capacity as secondary storage system 104. For example, secondary storage system 104 may be comprised of three physical storage nodes, each physical storage having a storage capacity of 10 TB. Cloud portal 123*a* may be configured to generate cloud instantiation 122*a* to include three virtual cloud instances, each virtual cloud instance having a storage capacity of 10 TB. The virtual cloud instances may be stored across one or more virtual machines. In other embodiments, cloud instantiation 122*a* of secondary storage system 104 has more storage capacity than secondary storage system 104. In other embodiments, cloud instantiation 122*a* of secondary storage system has less storage capacity than secondary storage system 104. Cloud instantiation 122*a* of secondary storage system 104 may be configured for the public cloud (e.g., Amazon Web Services, Microsoft Azure, Google Cloud, etc.) in which cloud instantiation 122*a* will reside.

Secondary storage system 104 may be configured to provide to cloud instantiation 122*a* of secondary storage system 104 one or more secondary storage snapshots (i.e. corresponding copies of one or more backup snapshots that are received from the primary system). In some embodiments, the one or more secondary storage snapshots are replication data associated with one or more corresponding backup snapshots.

A secondary storage snapshot may be provided cloud instantiation 122*a* of secondary storage system 104 according to one or more secondary storage snapshot policies. A secondary storage snapshot policy may cause secondary storage system 104 to send to cloud instantiation 122*a* of secondary storage system 104 a secondary storage snapshot for each backup snapshot received from primary system 102, after a threshold number of backup snapshots are received from primary system 102, or according to a backup schedule (e.g., once per day, once per week, etc.).

Cloud instantiation 122*a* of secondary storage system 104 may be hosted on a cloud server. The cloud server may receive from cloud portal 123*a* an instruction to generate cloud instantiation 122*a* of secondary storage system 104. The cloud server may provide the instruction to an agent (not shown) running on the cloud server to generate cloud instantiation 122*a* of secondary storage system 104. In some embodiments, cloud portal 123*a* and cloud instantiation 122*a* of secondary storage system 104 are hosted on the same cloud server hosted in cloud environment 121*a*. In other embodiments, cloud portal 123*a* and cloud instantiation 122*a* of secondary storage system 104 are hosted on different cloud servers hosted in cloud environment 121*a*.

In other embodiments, secondary storage system 104 is configured to archive data associated with one or more backup snapshots according to one or more archive policies. In some embodiments, an archive policy indicates that the data associated with a backup snapshot is to be archived to cloud object storage 124*a* on a periodic basis (e.g., hourly, daily, weekly, monthly, etc.), when a threshold size of data has changed, and/or upon a command from a user associated with secondary storage system 104. An archived backup snapshot may be a serialized version of the data associated with a backup snapshot.

Cloud object storage 124*a* may be configured to store a plurality of snapshot archives. A subset of the snapshot archives may be received from secondary storage system 104 or cloud instantiation 122*a* of secondary storage system 104. Cloud object storage 124*a* is configured to store snapshot archives associated with a plurality of datacenters. Cloud object storage 124*a* may receive a request for one of the stored snapshot archives. In response to the request, cloud object storage 124*a* is configured to provide the requested snapshot archive to the cloud instantiation associated with the request, for example, cloud instantiation 122*a*. The requested snapshot archive may be comprised of a serialized data file.

Serializing is a process by which a data file is generated to store data in a manner that mimics the structure of a tree data structure. The serialized data file may be encoded in a manner that allows the serialized data file to be utilized to reconstruct a desired portion of the tree data structure to obtain a data of interest from the serialized data file without the need to reconstruct the entire tree data structure. The serialized data file is a flat set of data comprised of a plurality of data blocks. A data block of the data file may correspond to a node of a tree data structure. The order of the data blocks of the serialized data file corresponds to an order of the tree data structure. A tree data structure may have a root node, a plurality of intermediate nodes, and a plurality of leaf nodes. The serialized data file may first include a data block corresponding to the root node, then data blocks corresponding to the plurality of intermediate nodes, and then data blocks corresponding to the plurality of leaf nodes. For example, a first data block of the serialized data file may correspond to a root node of the tree data structure, a second data block of the serialized data file may correspond to a first intermediate node of the tree data structure, a third data block of the serialized data file may correspond to a second intermediate node of the tree data structure, a fourth data block of the serialized data file may correspond to a first leaf node of the tree data structure, . . . and an nth data block of the serialized data file may correspond to the nth leaf node of the tree data structure.

Cloud instantiation 122a of secondary storage system 104 may include virtual file system manager 125a. Cloud instantiation 122a may receive one or more secondary storage snapshots from secondary storage system 104 (e.g., replication data of a backup snapshot) and virtual file system manager 125a may virtually rebuild the secondary storage clusters of secondary storage system 104 based on the one or more secondary storage snapshots.

The secondary storage clusters of secondary storage system 104 may be virtually rebuilt by building a tree data structure based on the file system data included in the secondary storage snapshot. Virtual file system manager 125a may build the tree data structure by deserializing a serialized data file associated with a snapshot archive. The rebuilt tree data structure is similar to the tree data structure generated by file system manager 105 of secondary storage system 104.

Cloud instantiation 122a of secondary storage system 104 may be in a standby mode while secondary storage system 122a is online. While in the standby mode, cloud instantiation 122a of secondary storage system 104 may maintain its data by receiving one or more secondary storage snapshots from secondary storage system 104 and in response to receiving the one or more secondary storage snapshots, generating one or more tree data structures and/or updating one or more tree data structures based on the data included in the one or more received secondary storage snapshots.

Secondary storage system 104 may go offline. During this period of time, secondary storage system 104 may be unable to perform one or more secondary storage functions for primary system 102 and primary system 102 must wait for secondary storage system 104 to come back online. For example, secondary storage system 104 may be unable to back up primary system 102, restore one or more files to primary system 102, and/or deploy a cloud instance of a virtual machine stored by secondary storage system 104. A physical component of secondary storage system 104 may have failed and needs to be replaced. It may take a particular period of time before the physical component is replaced (e.g., due to shipping time and/or repair time). Cloud instantiation 122a of secondary storage system 104 may be deployed upon determining that secondary storage system 104 is offline. In some embodiments, cloud instantiation 122a of secondary storage system 104 receives an indication that secondary storage system 104 is offline. For example, secondary storage system 104 may send a heartbeat signal to cloud instantiation 122a of secondary storage system 104. Cloud instantiation 122a of secondary storage system 104 may determine that secondary storage system 104 is offline in the event the heartbeat signal is not received within a threshold period of time. In other embodiments, a user associated with secondary storage system 104 provides an indication that secondary storage system 104 is offline.

Cloud deployment server 126a may be deployed to cloud environment 121a, such as Amazon Web Services, Microsoft Azure, Google Cloud, etc. A user virtual machine stored by cloud instantiation 122a of secondary storage system 104 may be associated with a first virtual machine format (e.g., VMware). A virtual machine running on cloud deployment server 126a may be associated with a second virtual machine format (e.g., Amazon Web Services virtual machine, Microsoft Azure virtual machine, Google Cloud virtual machine, etc.). The user virtual machine may be converted into a virtual machine format associated with cloud environment 121a to which cloud deployment server 126a is deployed.

In some embodiments, a version of a user virtual machine is selected to be deployed to cloud deployment server 126a. Cloud instantiation 122a of secondary storage system 104 may identify a tree data structure corresponding to the selected version of the user virtual machine, traverse the identified tree data structure to locate the data associated with the selected version of the user virtual machine, convert the selected version of the user virtual machine into a format that is compatible with a cloud environment in which the user virtual machine is to be deployed, and provide the data associated with converted virtual machine to cloud deployment server 126a located in cloud environment 121a.

In some embodiments, cloud instantiation 122a of secondary storage system 104 is configured to backup data associated with a user virtual machine running on cloud deployment server 126a. For example, the user virtual machine running on cloud deployment server 126a may be configured to perform one or more backup snapshots to cloud instantiation 122a of secondary storage system 104. In the event secondary storage system 104 comes back online, cloud instantiation 122a of secondary storage system 104 may be configured to copy the backup data associated with the user virtual machine running on cloud deployment server 126a. In response to receiving the copied data, secondary storage system 104 may be configured to update its tree data structures corresponding to the user virtual machine based on the copied data. After the secondary storage system is up-to-date, secondary storage system 104 may return as the primary backup storage for primary system 104 and cloud instantiation 122a of secondary storage system 104 may be torn down.

In some embodiments, a cloud instance of a user virtual machine stored on secondary storage system 104 is generated according to a backup policy. Secondary storage system 104 may be used to generate and deploy the cloud instance of the user virtual machine according to the backup policy. In other embodiments, primary system 102 is configured to perform one or more backup snapshots to cloud instantiation 122a of secondary storage system 104 and cloud instantiation 122a of secondary storage system 104 is configured to generate and deploy to cloud deployment server 126a the cloud instance of the user virtual machine according to the backup policy. Secondary storage system 104 or cloud instantiation 122a of secondary storage system 104 may be configured to convert a copy of the user virtual machine hosted on primary system 102 from a first virtual machine format to a second virtual machine format that is compatible with the cloud environment 121a in which the cloud instance of the virtual machine is to be deployed.

The backup policy may include a schedule that indicates a frequency at which a cloud instance of the user virtual machine is to be generated. For example, the cloud instance of the user virtual machine may be generated each time primary system 102 performs a backup snapshot that includes data associated with the user virtual machine to secondary storage system 104, on a periodic basis (e.g., hourly, daily, weekly, etc.) or when an amount of data associated with the user virtual machine has changed more than a change threshold amount. The cloud instance of the user virtual machine may be maintained in a standby mode in cloud environment 121a until a deploy condition (e.g., a virtual machine running on primary system 102 may go offline or primary system 102 may go offline) has been satisfied. In the event the deploy condition has been satisfied, the cloud instance of the user virtual machine is deployed and ready to be used by a user associated with the primary system within a short period of time (e.g., minutes).

In other embodiments, a cloud instance of the user virtual machine is generated in response to a user command (e.g., on-demand). For example, the cloud instance of the user virtual machine may be generated for test/development purposes. Secondary storage system 104 or cloud instantiation 122a of secondary storage system 104 may be used to generate and deploy the cloud instance of the user virtual machine.

In other embodiments, the cloud instance of the user virtual machine is generated in response to a determination that the virtual machine on primary system 102 is offline. For example, a user associated with primary system 102 may provide to secondary storage system 104 or to cloud instantiation 122a of secondary storage system 104 a command to generate the cloud instance of the virtual machine. In response to the command, secondary storage system 104 or cloud instantiation 122a of secondary storage system 104 may be configured to convert a copy of the virtual machine running on primary system 102 from a first virtual machine format to a second virtual machine format that is compatible with cloud environment 102 in which the cloud instance of the virtual machine is to be deployed and deploy the cloud instance of the virtual machine to cloud environment 121a.

In other embodiments, a user associated with primary system 102 desires to deploy a cloud instance of the virtual machine to cloud environment 121a, but secondary storage system 104 is offline and cloud instantiation 122a of secondary storage system 104 has yet to be generated. Cloud object storage 124a may store a snapshot archive that includes data associated with an archived version of the user virtual machine hosted on primary system 102. Cloud instantiation 122a of secondary storage system 104 may be generated, an archived version of the user virtual machine may be provided to cloud instantiation 122a of secondary storage system 104, cloud instantiation 122a of secondary storage system 104 may be configured to convert the archived version of the user virtual machine from a first virtual machine format to a second virtual machine format that is compatible with cloud environment 121a in which the cloud instance of the user virtual machine is to be deployed, and deploy the cloud instance of the user virtual machine to cloud environment 121a.

Figure 2A:
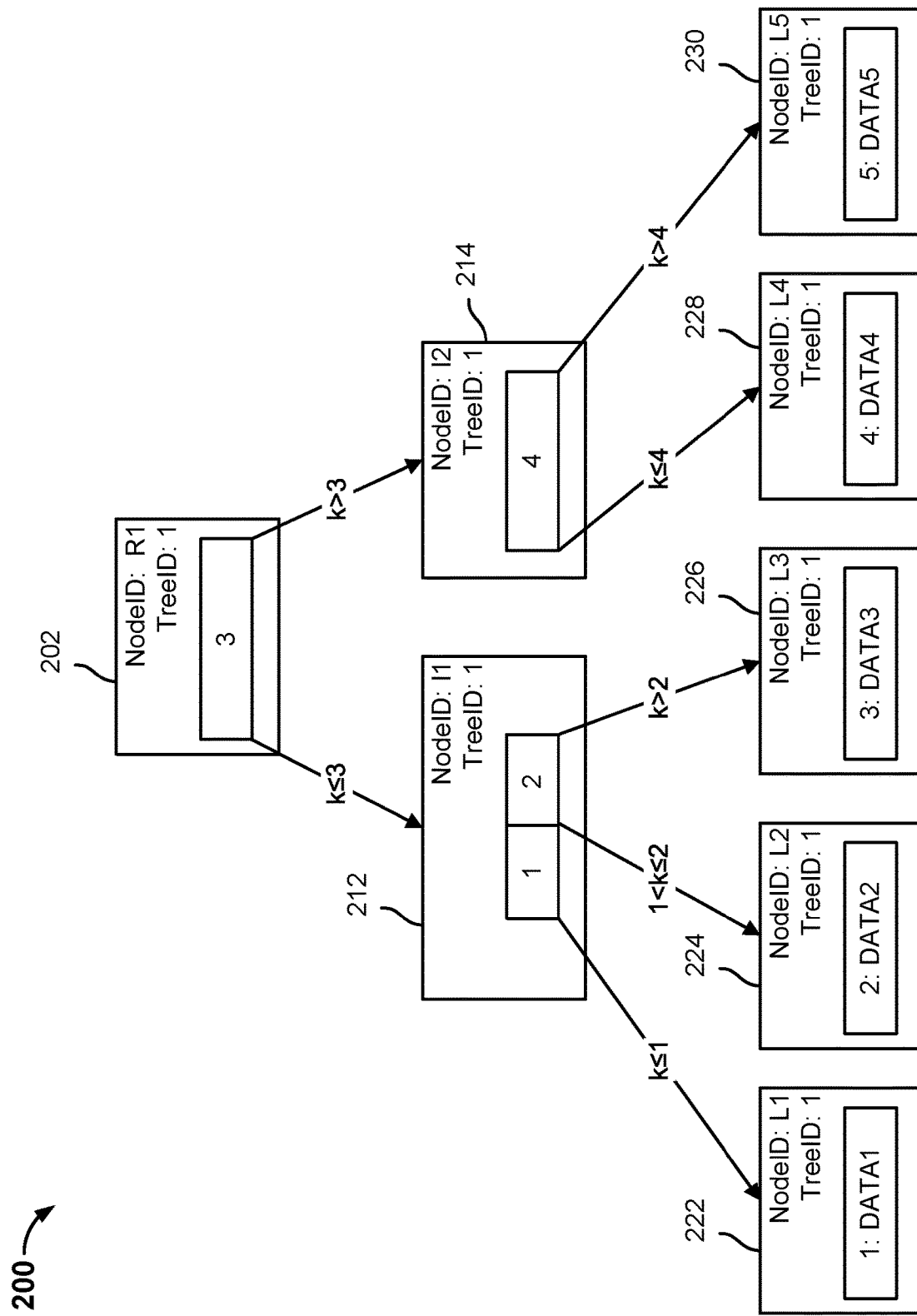
FIG. 2A is a block diagram illustrating an embodiment of a tree data structure.

FIG. 2A is a block diagram illustrating an embodiment of a tree data structure. A tree data structure may be used to represent the file system data that is stored on a secondary storage system, such as secondary storage system 104, or a cloud instantiation of a secondary storage system, such as cloud instantiation 122a of secondary storage system 104. The file system data may include metadata for a distributed file system and may include information, such as chunk identifier, chunk offset, file size, directory structure, file permissions, physical storage locations of the files, etc. A file system manager, such as file system manager 105 or virtual file system manager 125a, may generate tree data structure 200.

Tree data structure 200 is comprised of a file system metadata snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time t=1. The backup snapshot may be received at a secondary storage system from a primary system. In other embodiments, tree data structure 200 corresponds to a secondary storage snapshot. The secondary storage snapshot may be a copy of a backup snapshot. The secondary storage snapshot may be received at a cloud instantiation of a secondary storage system from the secondary storage system. The file system metadata snapshot tree in conjunction with a plurality of file metadata trees may provide a complete view of the primary system for a particular point in time.

A root node is the starting point of a file system metadata snapshot tree and may include pointers to one or more other nodes. An intermediate node is a node to which another node points (e.g., root node, other intermediate node) and includes one or more pointers to one or more other nodes. A leaf node is a node at the bottom of a file system metadata snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick identifier (e.g., brick number) of a data brick. A data brick may be associated with one or more data chunks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key. In other embodiments, a leaf node is configured to store the actual data when the data associated with a file is less than or equal to a limit size (e.g., 256 kb). In some embodiments, a leaf node includes a pointer to a file metadata tree (e.g., blob structure) when the size of a file is larger than the limit size. For example, a leaf node may include a pointer to a file metadata tree corresponding to a virtual machine container file associated with a user virtual machine.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "3." To find a leaf node storing a value associated with a data key of "4" or "5," the second branch of root node 202 would be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf nodes 222, 224, 226, 228, 230 include data key-value pairs of "1: DATA1," "2: DATA2," "3: DATA3," "4: DATA4," "5: DATA5," respectively. Leaf nodes 222, 224, 226, 228, 230 include a NodeID of "L1," "L2," "L3," "L4," "L5," respectively. Each of the leaf nodes 222, 224, 226, 228, 230 include a TreeID of "1." To view the value associated with a data key of "1," tree data structure 200 is traversed from root node 202 to intermediate node 212 to leaf node 222. To view the value associated with a data key of "2," tree data structure 200 is traversed from root node 202 to intermediate node 212 to leaf node 224. To view the value associated with a data key of "3," tree data structure 200 is traversed from root node 202 to intermediate node 212 to leaf node 226. To view the value associated with a data key of "4," tree data structure 200 is traversed from root node 202 to intermediate node 214 to leaf node 228. To view the value associated with a data key of "5," tree data structure 200 is traversed from root node 202 to intermediate node 214 to leaf node 230. In some embodiments, leaf node 222, 224, 226, 228, 230 are configured to store metadata associated with a file. In other embodiments, leaf node 222, 224, 226, 228, 230 are configured to store a pointer to a file metadata tree (e.g., blob structure).

Figure 2B:
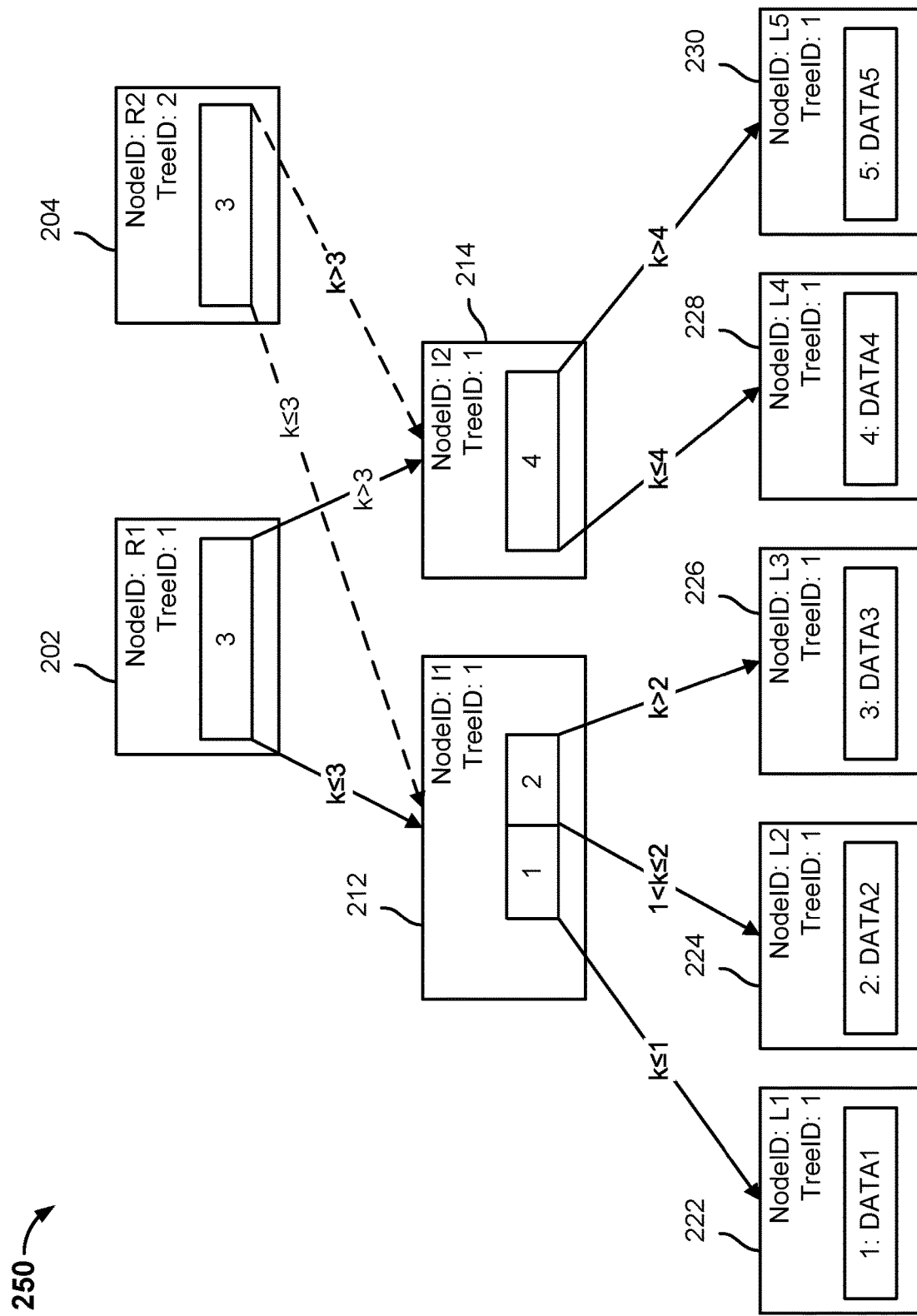
FIG. 2B is a block diagram illustrating an embodiment of a cloned file system metadata snapshot tree.

FIG. 2B is a block diagram illustrating an embodiment of a cloned file system metadata snapshot tree. A file system metadata snapshot tree may be cloned when a file system metadata snapshot tree is added to a tree data structure. In some embodiments, tree data structure 250 may be created by a storage system, such as secondary storage system 104 or a cloud instantiation of a secondary storage system, such as cloud instantiation 122a of secondary storage system 104. The file system data of a primary system, such as primary system 102, may be backed up to a secondary storage system, such as secondary storage system 112. A subsequent backup snapshot may correspond to a full backup snapshot or an incremental backup snapshot. The manner in which the file system data corresponding to the subsequent backup snapshot is stored in secondary storage system may be represented by a tree data structure. The tree data structure corresponding to the subsequent backup snapshot is created by cloning a file system metadata snapshot tree associated with a last backup snapshot. The tree data structure associated with a plurality of secondary storage snapshots may be cloned in a similar manner.

In the example shown, tree data structure 250 includes root nodes 202, 204, intermediate nodes 212, 214, and leaf nodes 222, 224, 226, 228, and 230. Tree data structure 250 may be a snapshot of file system data at a particular point in time, such as t=2. The tree data structure can be used to capture different versions of file system data at different moments in time. The tree data structure may allow a chain of backup snapshot versions (i.e., file system metadata snapshot trees) and/or a chain of secondary storage snapshot versions to be linked together by allowing a node of a later version of a file system metadata snapshot tree to reference a node of a previous version of a file system metadata snapshot tree. For example, a snapshot tree with root node 204 is linked to a snapshot tree with root node 202. Each time a backup snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID. The TreeID is the view identifier associated with a view of the primary system corresponding to the particular moment in time.

In some embodiments, a root node is associated with a current view of the file system data. A current view may still accept one or more changes to the data. The TreeID of a root node indicates a backup snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

In the example shown, root node 204 is a clone (e.g., a copy) of root node 202. Similar to root node 202, root node 204 includes the same pointers as root node 202. Root node 204 includes a first set of pointers to intermediate node 212. Root node 204 includes a NodeID of "R2" and a TreeID of "2."

Figure 2C:
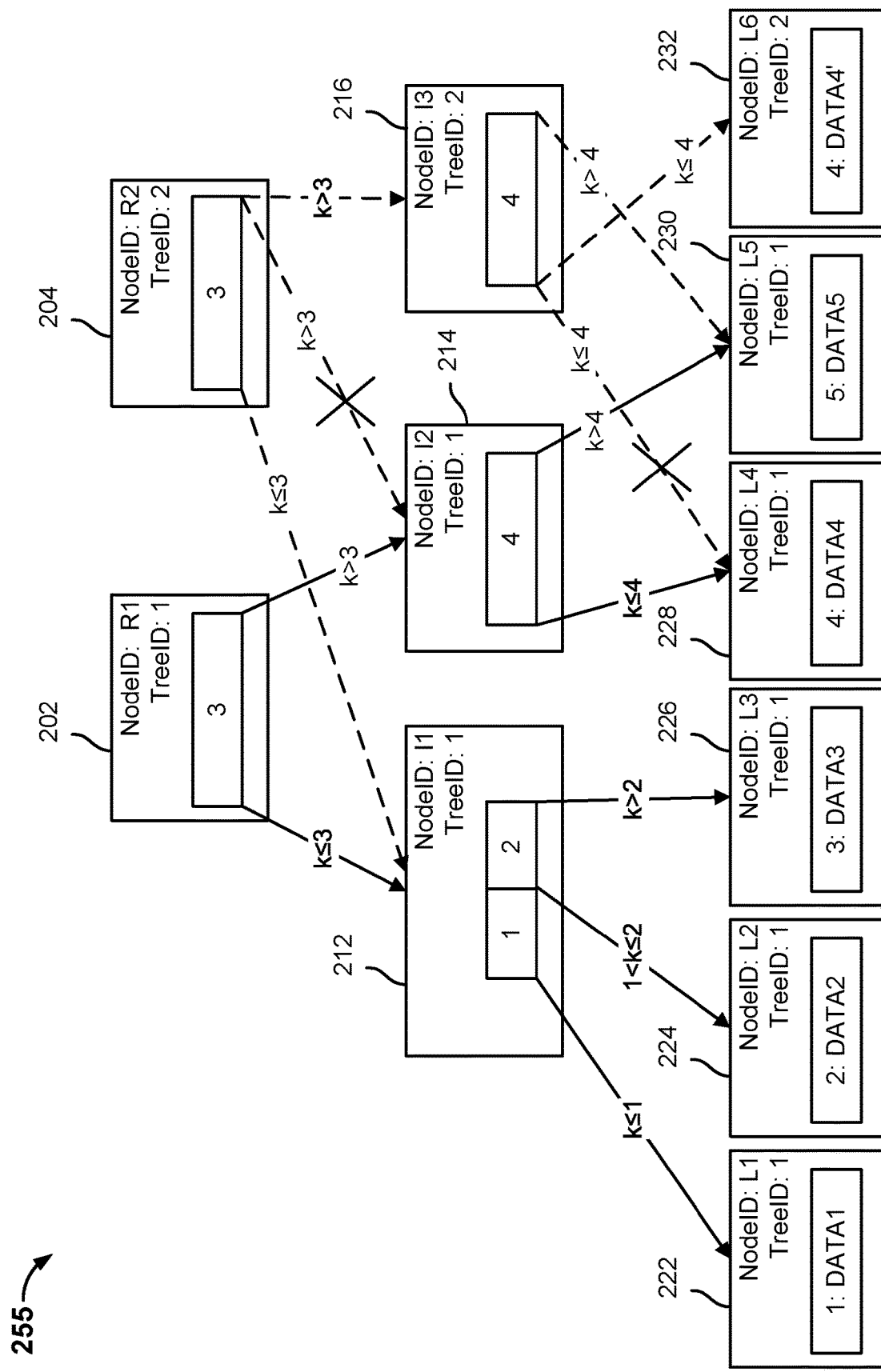
FIG. 2C is a block diagram illustrating an embodiment of modifying a file system metadata snapshot tree.

FIG. 2C is a block diagram illustrating an embodiment of modifying a file system metadata snapshot tree. In the example shown, tree data structure 255 may be modified by a file system manager, such as file system manager 105 or virtual file system manager 125*a*. A file system metadata snapshot tree with a root node 204 may be a current view of the file system data at time t=1. A current view represents a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data, are made.

In the example shown, the value "DATA4" has been modified to be "DATA4'." In some embodiments, the value of a key value pair has been modified. For example, the value of "DATA4" may be a pointer to a file metadata tree corresponding to a first version of a virtual machine and the value of "DATA4'" may be a pointer to a file metadata tree corresponding to the second version of the virtual machine.

In other embodiments, the value of the key pair is the data associated with a content file that is smaller than or equal to a limit size. In other embodiments, the value of the key value pair points to a different file metadata tree. The different file metadata tree may be a modified version of the file metadata tree that the leaf node previously pointed (e.g., a different version of a virtual machine container file).

To modify a file system metadata snapshot tree, the file system manager starts at root node 204 because that is the root node associated with snapshot tree at time t=2 (i.e., the root node associated with the last backup snapshot). The value "DATA4" is associated with the data key "4." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data associated with a file that is smaller than or equal to a limit size. In other embodiments, leaf node 232 stores a pointer to a file metadata tree corresponding to a file, such as a virtual machine container file.

Figure 2D:
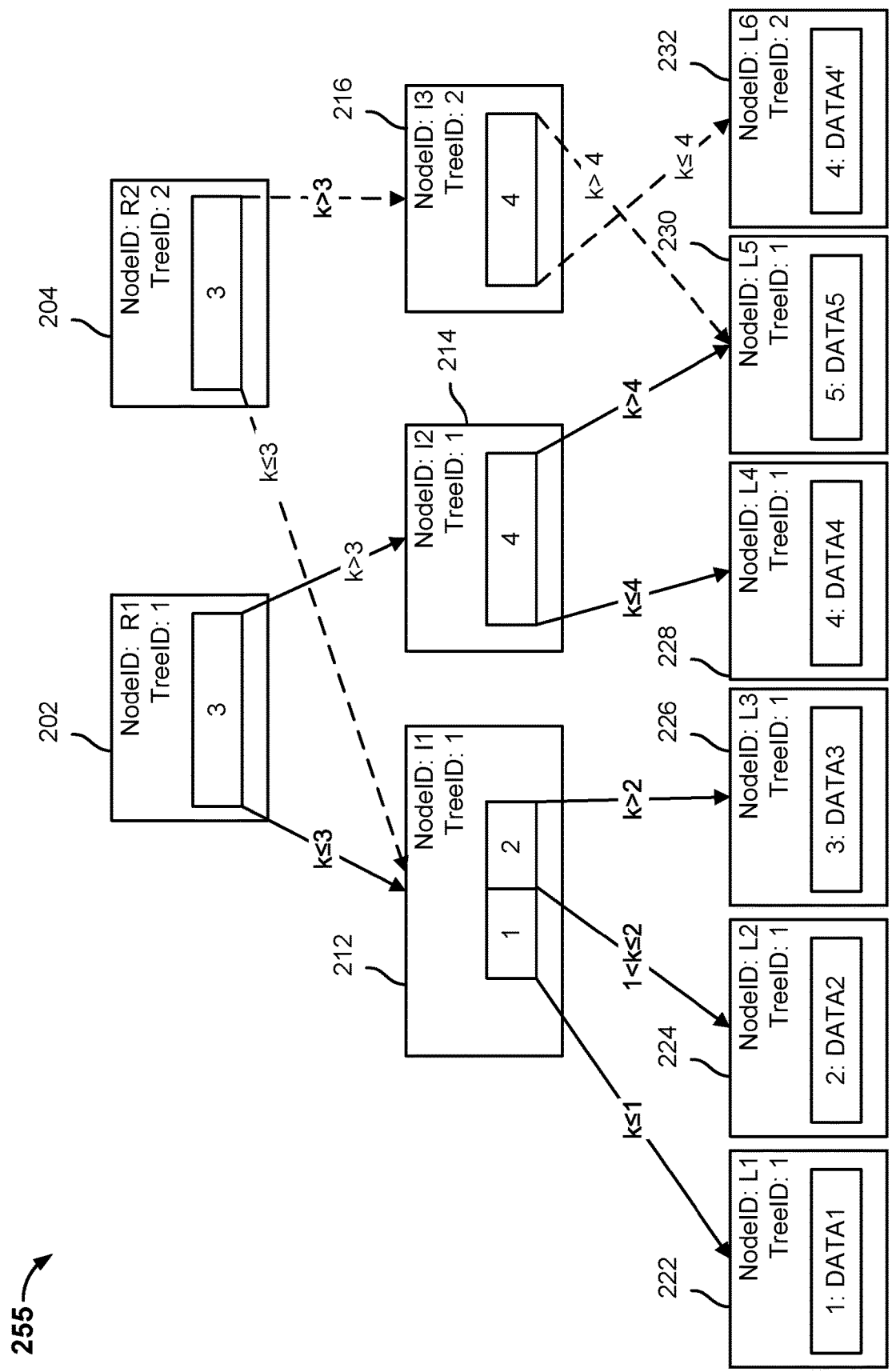
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 2E:
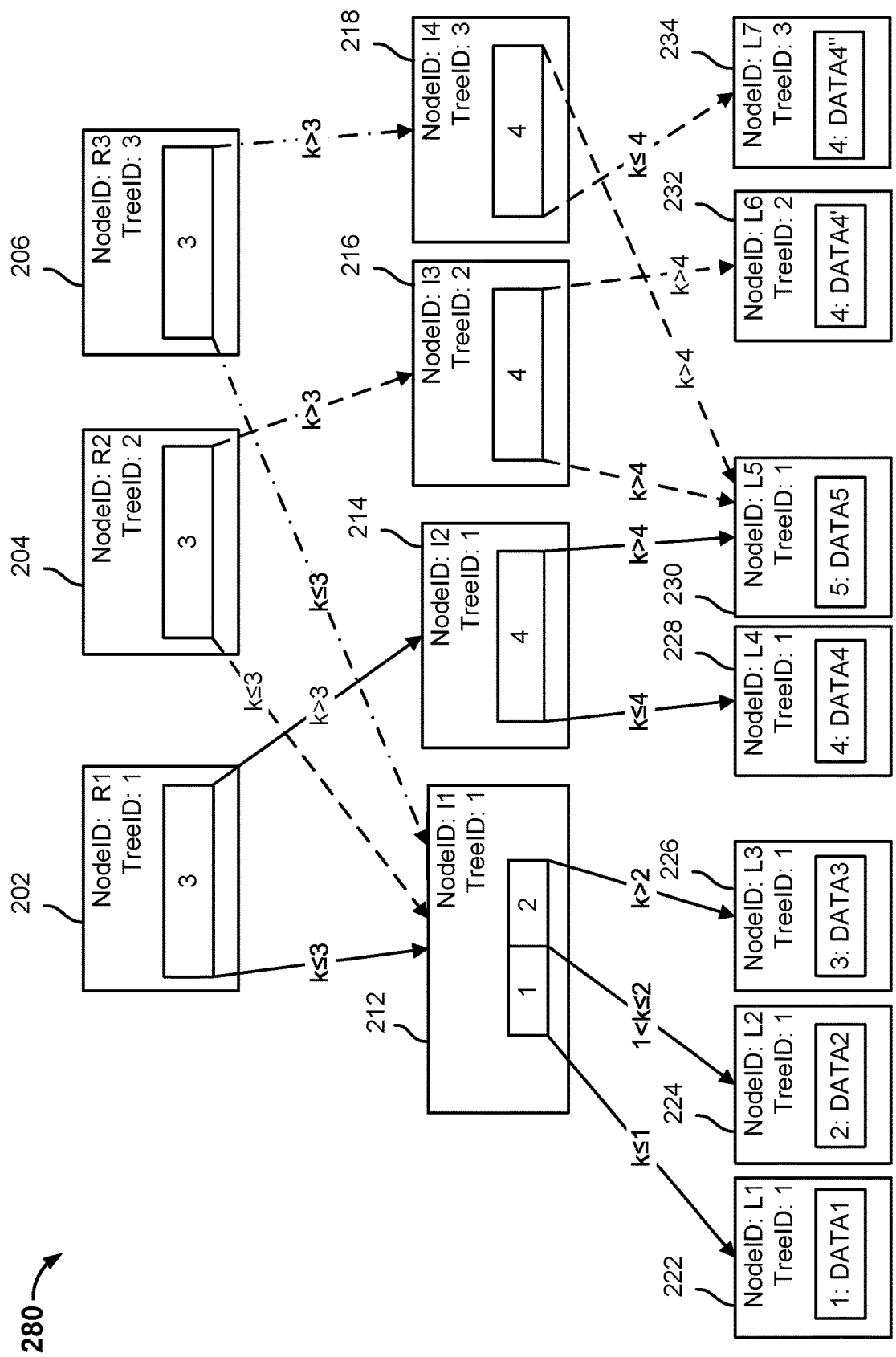
FIG. 2E is a block diagram illustrating an embodiment of a tree data structure at a particular moment in time.

FIG. 2E is a block diagram illustrating an embodiment of a tree data structure at a particular moment in time. In the example shown, tree data structure 280 includes a snapshot tree at time t=3. The tree data structure allows a chain of snapshot trees to be linked together. Each time a backup snapshot is performed, a root node of the snapshot tree may be linked to one or more intermediate nodes associated with a previous snapshot tree. In the example shown, tree data structure 280 includes a file system metadata snapshot tree comprising root node 206, intermediate nodes 212, 218, and leaf nodes 222, 224, 226, 230, 234. Root node 202 is associated with a first backup snapshot, root node 204 is associated with a second backup snapshot, and root node 206 is associated with a third backup snapshot. The snapshot tree having root node 206 is a modified version of the snapshot tree having root node 204 (i.e., the value of "DATA4'" has been modified to be "DATA4''").

Figure 3A:
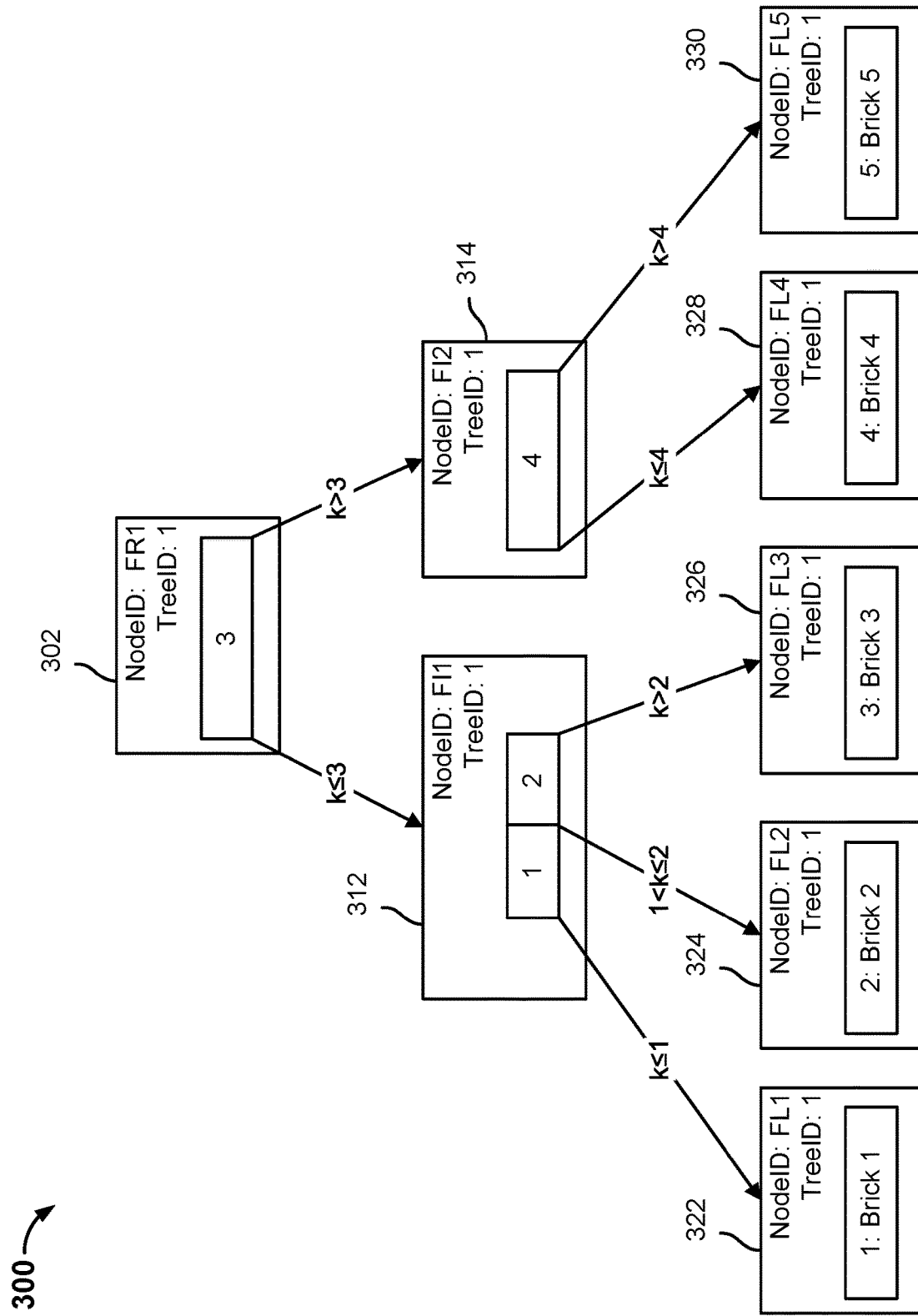
FIG. 3A is a block diagram illustrating an embodiment of a tree data structure.

FIG. 3A is a block diagram illustrating an embodiment of a tree data structure. In some embodiments, tree data structure 300 may be created by a storage system, such as secondary storage system 104, or a cloud instantiation of a secondary storage system, such as cloud instantiation 122a of secondary storage system 104. In the example shown, tree data structure 300 corresponds to a file and stores the metadata associated with the file. For example, tree data structure 300 may correspond to a virtual machine container file and may be used to store virtual machine file system metadata. A leaf node of a file system metadata snapshot tree, such as a leaf node of tree data structures 200, 250, 255, may include a pointer to a tree data structure corresponding to a file, such as tree data structure 300. A tree data structure corresponding to a file (i.e., a "file metadata tree") is a snapshot tree, but is used to organize the data blocks associated with a file that are stored on the secondary storage system or a cloud instantiation of the secondary storage system. Tree data structure 300 may be referred to as a "metadata structure" or a "snapshot structure."

A tree data structure corresponding to a content file (e.g. virtual machine container file) at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time t=1.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar of the file system metadata snapshot trees described above, each node includes a "NodeID" that identifies the node and a "TreeID" that identifies a snapshot/view with which the node is associated.

In the example shown, root node 302 includes a pointer to intermediate node 312 and a pointer to intermediate node 314. Root node 202 includes a NodeID of "FR1" and a TreeID of "1."

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 will lead to the node with a data key of "1." The pointer to leaf node 324 indicates that traversing tree data structure 300 from intermediate node 312 to leaf node 324 will lead to the node with a data key of "2." The pointer to leaf node 326 indicates that traversing tree data structure 300 from intermediate node 312 to leaf node 326 will lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 will lead to the node with a data key of "4." The pointer to leaf node 330 indicates that traversing tree data structure 300 from intermediate node 314 to leaf node 330 will lead the node with a data key of "5."

Leaf node 322 includes a data key-value pair of "1: Brick 1." "Brick 1" is a brick identifier that identifies the data brick associated with one or more data chunks of a content file (e.g., virtual machine container file) corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" may be associated with one or more data chunks associated with a content file (e.g., virtual machine container file). Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" may be associated with one or more data chunks associated with a content file (e.g., virtual machine container file). Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" may be associated with one or more data chunks associated with a content file (e.g., virtual machine container file). Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" may be associated with one or more data chunks associated with a content file (e.g., virtual machine container file). Leaf node 330 includes NodeID of "FL5" and a TreeID of "1." To view the value associated with a data key of "5," tree data structure 300 is traversed from root node 302 to intermediate node 314 to leaf node 330.

A content file, such as a virtual machine container file, may be comprised of a plurality of data chunks. A brick may be associated with one or more data chunks. In the example shown, leaf nodes 322, 324, 326, 328, 330 each store a corresponding brick identifier. The location of the data chunks associated with a data brick may be identified using a table stored in a metadata store that matches brick numbers to chunk identifiers or the location of the data brick may be identified based on the pointer to the data brick. A chunk file table may associate chunk identifiers (e.g., SHA-1) with a chunk file id. A chunk file is configured to store a plurality of data chunks. The file table may include associate a location of a chunk identifier with an offset within a chunk file id. The one or more data chunks associated with a brick identifier may be determined based on a corresponding chunk identifier and a corresponding chunk file id.

Figure 3B:
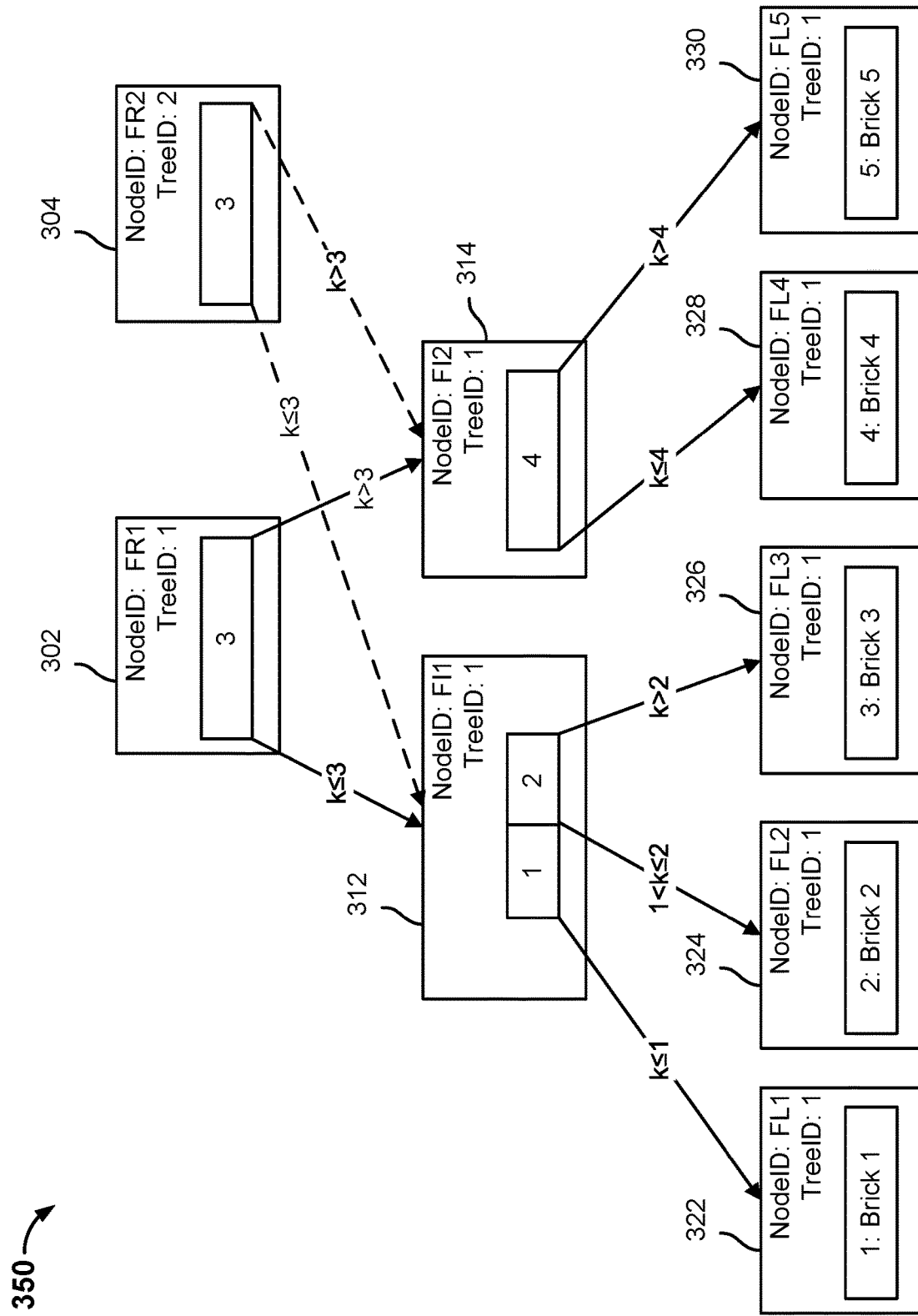
FIG. 3B is a block diagram illustrating an embodiment of adding a file metadata tree to a tree data structure.

FIG. 3B is a block diagram illustrating an embodiment of adding a file metadata tree to a tree data structure. In some embodiments, tree data structure 350 may be created by a storage system, such as secondary storage system 104 or a cloud instantiation of a secondary storage system, such as cloud instantiation 122a of secondary storage system 104. The tree data structure corresponding to a file can be used to capture different versions of the file at different moments in time. When a backup snapshot or secondary storage snapshot is received, a root node of the file metadata tree may be linked to one or more intermediate nodes associated with a previous file metadata tree. This may occur when the file is included in both backup/secondary storage snapshots.

In the example shown, tree data structure 350 includes a first file metadata tree comprising root node 302, intermediate nodes 312, 314, and leaf nodes 322, 324, 326, 328, and 330 and a second file metadata tree comprised of root node 304, intermediate nodes 312, 314, and leaf nodes 322, 324, 326, 328, and 330. The second file metadata tree may correspond to a version of a file at a particular point in time, for example at time t=2. The first file metadata tree may correspond to a first version of a virtual machine container file and the second file metadata tree may correspond to a second version of the virtual machine container file.

To create a snapshot of the file data at time t=2, a new root node is created. The new root node may be clone of the original node and include the same set of pointers as the original node, but includes a different NodeID and a different TreeID. In the example shown, root node 304 includes a set of pointers to intermediate nodes 312, 314, which are intermediate nodes associated with a previous snapshot. In the example shown, root node 304 is a copy of root node 302. Similar to root node 302, root node 304 includes the same pointers as root node 302. Root node 304 includes a NodeID of "FR2" and a TreeID of "2."

Figure 3C:
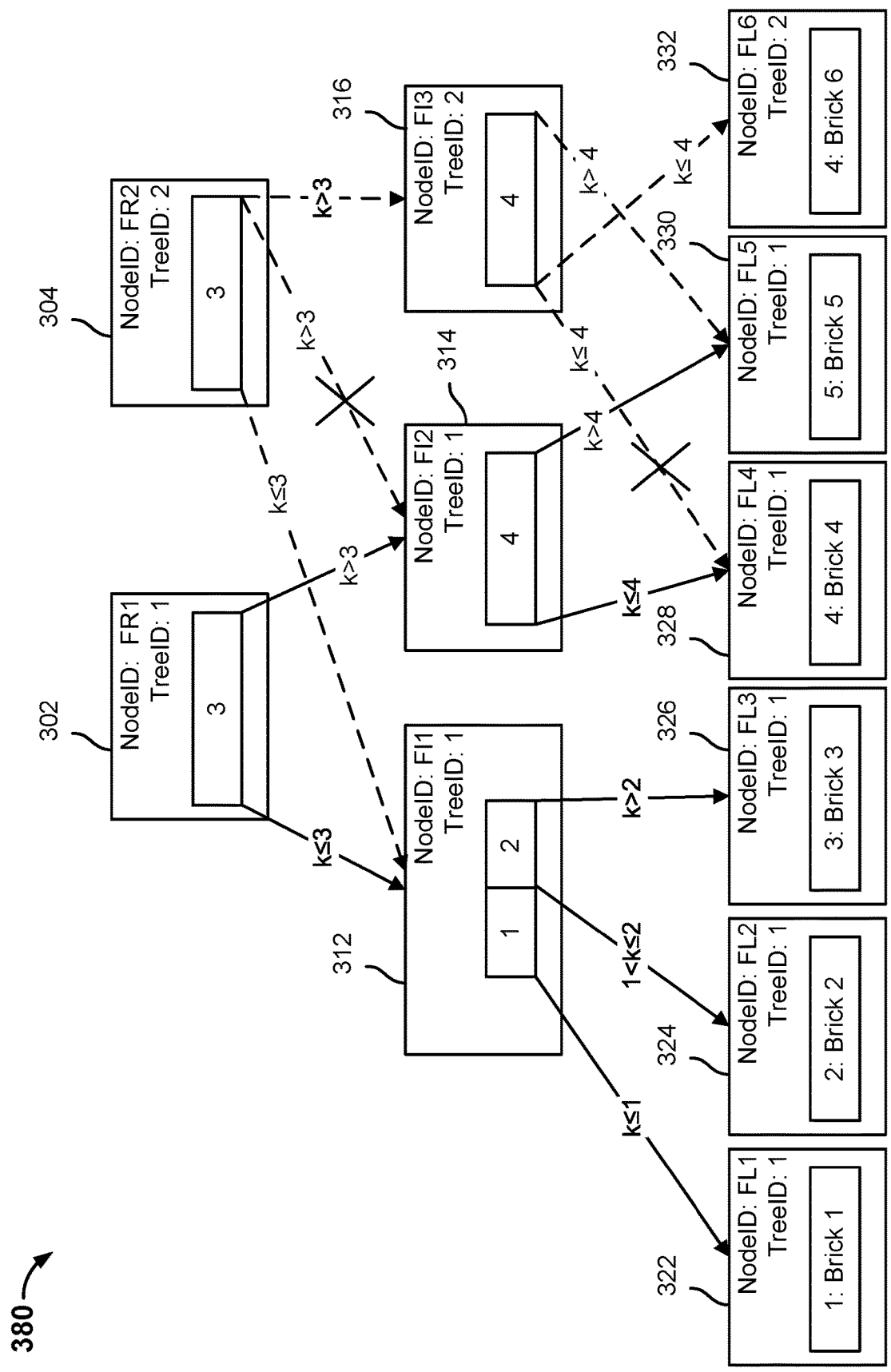
FIG. 3C is a block diagram illustrating an embodiment of modifying a file metadata tree.

FIG. 3C is a block diagram illustrating an embodiment of modifying a file metadata tree. In the example shown, tree data structure 380 may be modified by a file system manager, such as file system manager 105 or virtual file system manager 125a. A file metadata tree with root node 304 may be a current view of the file data at time, for example, at time t=2.

In some embodiments, the file data of a content file may be modified such that one of the data chunks is replaced by another data chunk. When a data chunk of file data associated with a previous backup snapshot is replaced with a new data chunk, the data brick associated with the new data chunk may be different. A leaf node of a file metadata tree may be configured to store a brick identifier of a brick associated with the new data chunk. To represent this modification to the file data, a corresponding modification is made to a current view of a file metadata tree. The data chunk of the file data that was replaced has a corresponding leaf node in the previous file metadata tree. A new leaf node in the current view of the file metadata tree is created, as described herein, that corresponds to the new data chunk. The new leaf node includes an identifier associated with the current view. The new leaf node may also store the chunk identifier associated with the modified data chunk.

In the example shown, a data chunk associated with "Brick 4" has been modified. The data chunk associated with "Brick 4" has been replaced with a data chunk associated with "Brick 6." In some embodiments, the data chunk associated with "Brick 6" includes a data chunk associated with a virtual machine container file. At t=2, the file system manager starts at root node 304 because that is the root node associated with the file metadata tree at time t=2. The value "Brick 4" is associated with the data key "4." The file system manager traverses tree data structure 380 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 380 from intermediate node 316 to leaf node 328, determines that the TreeID of leaf node 328 does not match the TreeID of root node 304, and creates a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
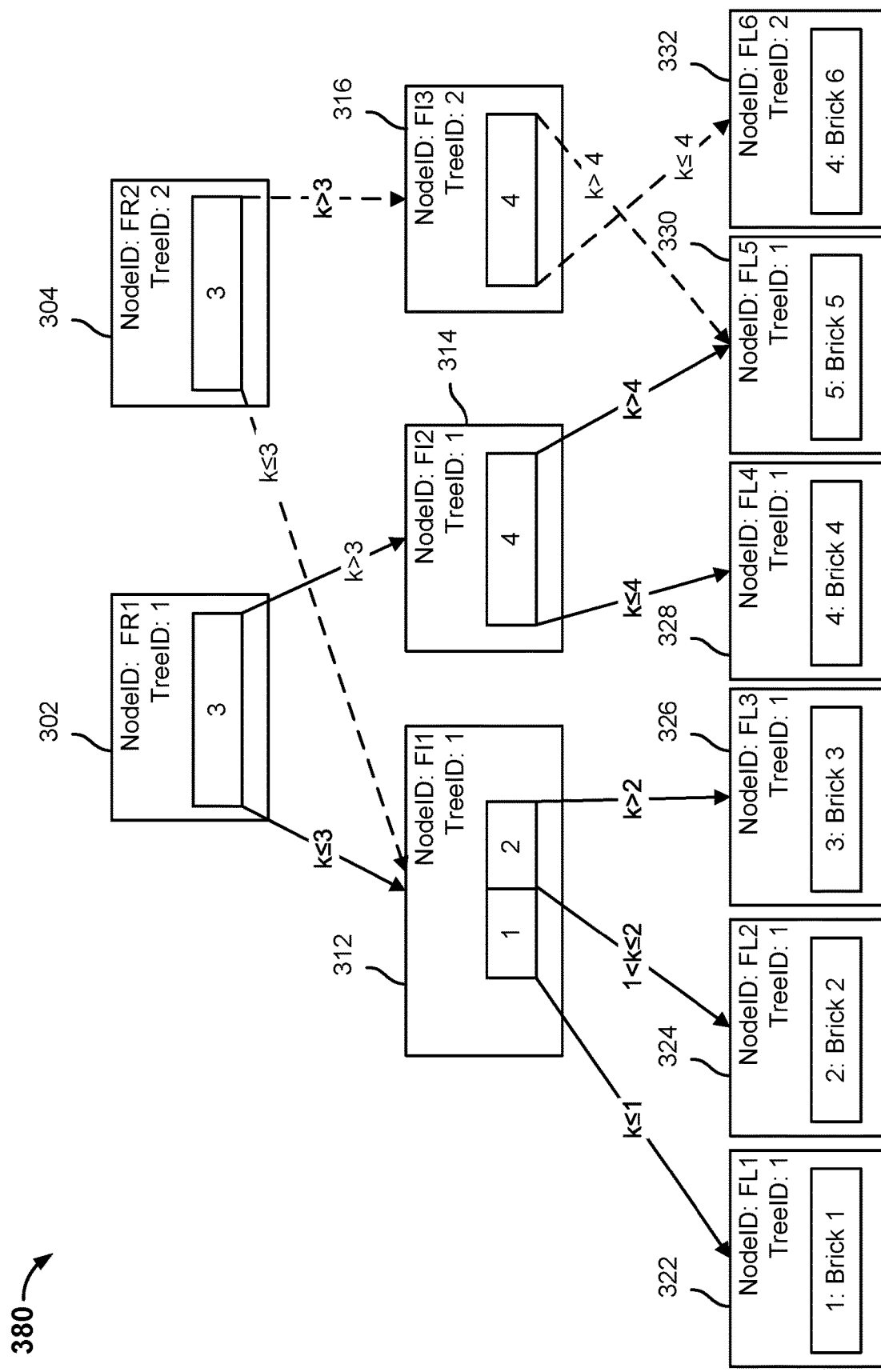
FIG. 3D is a block diagram illustrating an embodiment of a modified file metadata tree.

FIG. 3D is a block diagram illustrating an embodiment of a modified file metadata tree. The file metadata tree 380 shown in FIG. 3D illustrates a result of the modifications made to file metadata tree 380 as described with respect to FIG. 3C.

Figure 4A:
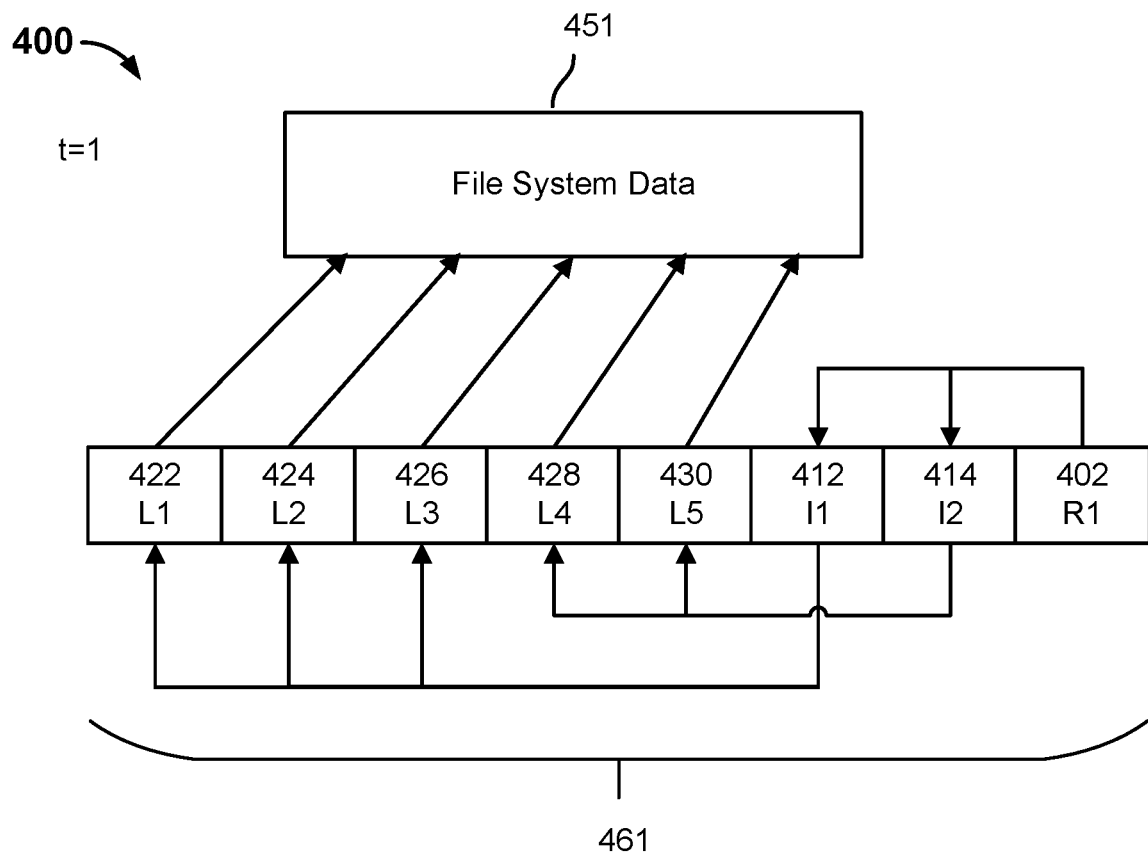
FIG. 4A is a block diagram illustrating an embodiment of archive data.

FIG. 4A is a block diagram illustrating an embodiment of archive data. A backup snapshot is the state of a system at a particular moment in time. A backup snapshot may be stored locally at a storage system, such as secondary storage system 104. A backup snapshot allows the state of a system to be rolled back to a moment in time for which a backup snapshot is stored. A system may store a large number of backup snapshots (e.g., thousands, millions). Each backup snapshot may require a significant amount of storage (e.g., GBs, TBs, PBs, etc.). In some embodiments, it is be desirable to archive a backup snapshot to a remote storage location, such as cloud object storage 124a. For example, one or more older backup snapshots may be archived to cloud object storage 124a for long-term retention, for data recovery purposes (e.g., a primary system virtual machine is offline and a secondary storage system storing a backup of the primary system virtual machine is also offline), to handle spikes in storage demand, etc. One or more backup snapshots that include cold data (i.e., data that is not accessed frequently) may be archived to cloud object storage to free up local storage for one or more snapshots that include hot data (i.e., data that is accessed frequently).

The file system data associated with a backup snapshot may be archived from a secondary storage system to a remote storage location. An archive policy may indicate that a full snapshot archive of a backup snapshot or an incremental snapshot archive of the backup snapshot is to be performed and stored at the remote storage location. A full snapshot archive includes a complete view of a file system metadata snapshot tree at a particular moment in time. For example, a full snapshot archive associated with a backup snapshot at t=3, as depicted in FIG. 2E, includes root node 206, intermediate nodes 212, 218, and leaf nodes 222, 224, 226, 230, and 234.

An incremental snapshot archive includes a partial view of a file system metadata snapshot tree at a particular moment in time. An incremental snapshot archive may include a representation of what was not previously archived. For example, an incremental snapshot archive associated with a backup snapshot at t=3, as depicted in FIG. 2E, includes root node 206, intermediate node 218, and leaf node 234. The incremental snapshot archive associated with a backup snapshot at t=3 does not include root nodes 202, 204, intermediate nodes 212 or leaf nodes 222, 224, 226, 228, 230 because those nodes were previously archived.

Figure 4B:
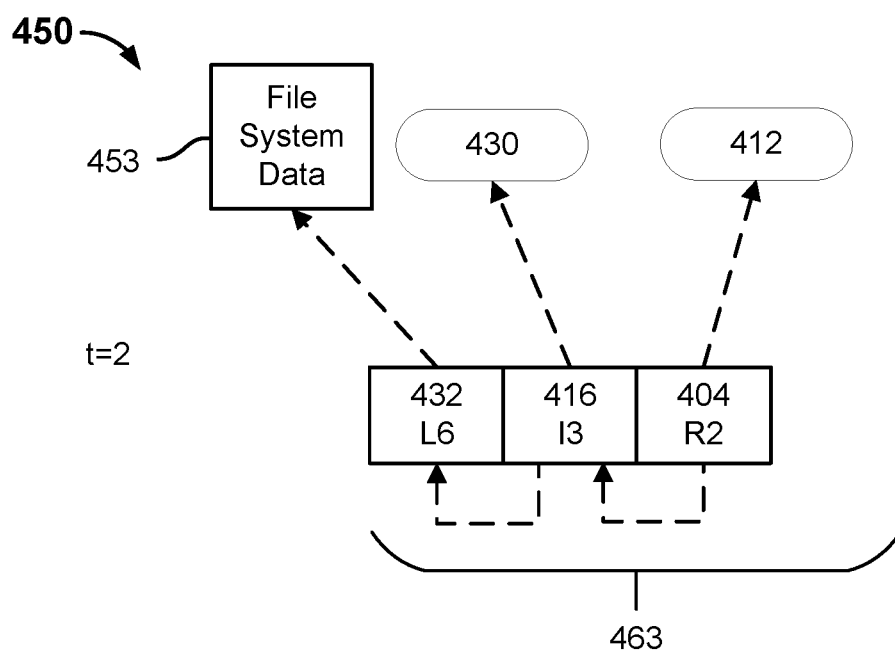
FIG. 4B is a block diagram illustrating an embodiment of archive data.
Figure 4C:
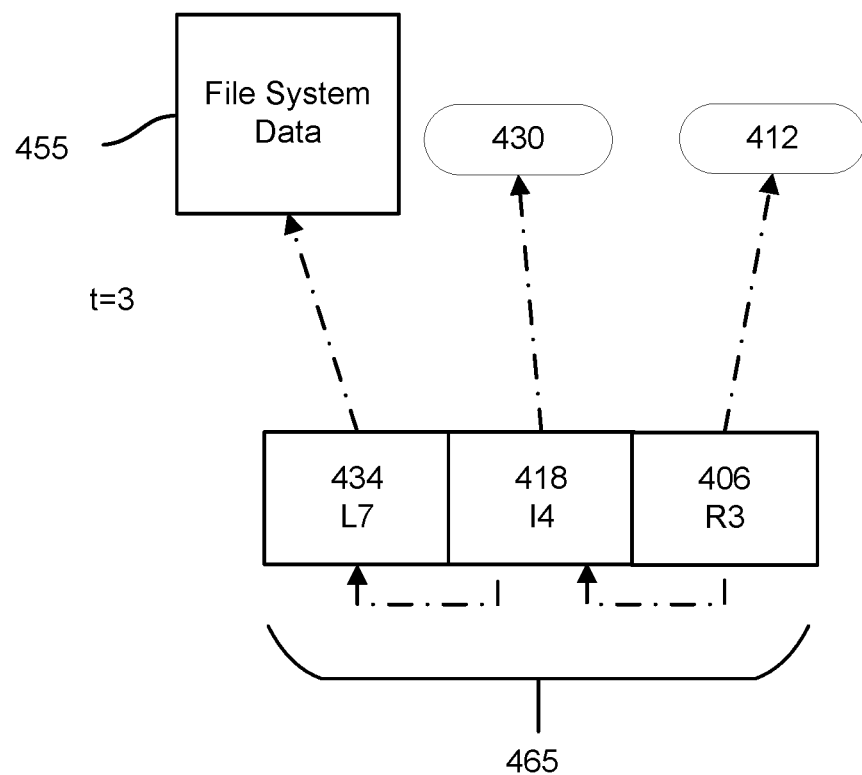
FIG. 4C is a block diagram illustrating an embodiment of archive data.

A snapshot archive may be performed based on one or more policies associated with a backup storage system. For example, a full snapshot archive may be performed on a periodic basis (e.g., every X day(s), every Y week(s), every Z month(s), etc.), upon a threshold size of bytes changing from the previous full snapshot, after a threshold number of incremental snapshot archives have been performed, etc. A policy may indicate that an incremental snapshot archive is to be performed on a more frequent basis than a full snapshot archive. The full snapshot archive and incremental snapshot archives may be associated with a backup snapshot corresponding to a state of file system data at a particular moment in time. For example, archive data 400 is associated with the snapshot tree corresponding to a backup snapshot at time t=1, archive data 450 is associated with the snapshot tree corresponding to a backup snapshot at time t=2, and archive data 480 is associated with the snapshot tree corresponding to a backup snapshot at time t=3. As seen in FIGS. 4A-4C, each snapshot archive builds off of a previous snapshot archive, that is, a block of serialized data includes a file offset to a block associated with previously serialized data.

In the example shown, archive data 400 includes file system data 451 and serialized tree data 461. In the example shown, archive data 400 is a file representation of a backup snapshot of the file system metadata snapshot tree at t=1. Archive data 400 is configured to store a full backup snapshot of the snapshot tree corresponding to a backup snapshot at time t=1. A full snapshot archive may include a complete view of the nodes of the file system metadata snapshot tree at a particular moment in time (i.e., all nodes associated with a root node of the snapshot tree) and the data referenced or stored in each of the leaf nodes of the file system metadata snapshot tree. For example, a leaf node may include a pointer to a storage location of a value. A full snapshot archive is independent on its own and does not refer back to one or more previous snapshot archives.

In the example shown, file system data 451 corresponds to data stored in the leaf nodes of the snapshot tree corresponding to a backup snapshot at time t=1. Since archive data 400 includes a full backup snapshot of the snapshot tree corresponding to the backup snapshot at t=1, file system data 451 includes the data stored in or referenced by leaf nodes 222, 224, 226, 228, and 230 in FIG. 2A, that is, file system data 451 includes "DATA1," "DATA2," "DATA3," "DATA4," and "DATA5." In some embodiments, the file system data is the data (e.g., data blocks of a file, data segments of a file) for a distributed file system. File system data may be stored as a flat set of data. In some embodiments, file system data 451 stores all the data blocks associated with leaf nodes of a snapshot tree. In some embodiments, file system data 451 stores a plurality of file data blocks in a single block of file system data 451. In some embodiments, the file system data includes file system metadata, such as file size, directory structure, file permissions, physical storage locations of the files, etc. In other embodiments, blocks 422, 424, 426, 428, 430 include file offsets to a serialized file metadata tree that corresponds to a file metadata tree. A serialized file metadata tree is similar to a serialized file system metadata tree, but serializes the nodes associated with a file metadata tree into a flat set of data.

A serialized tree data is configured to store the structure of the file system metadata snapshot tree associated with the file system data as a flat set of data that is comprised of one or more blocks. Each block of the flat set of data corresponds to a node of the snapshot tree. A block may contain a file offset. A file offset represents a pointer of a file system metadata snapshot tree. Because some archive systems cannot store pointers, a file offset is used in place of pointers. The file offset may be to another block of the serialized tree data. The file offset may be to another block of a different serialized tree data.

In the example shown, serialized tree data 461 corresponds to a snapshot tree corresponding to a backup snapshot at time t=1. Serialized tree data 461 is comprised of a plurality of blocks. Each block corresponds to one of the snapshot tree nodes. For example, blocks 422, 424, 426, 428, 430, 412, 414, and 402 correspond to nodes 222, 224, 226, 228, 230, 212, 214, and 202, respectively, of the file system metadata snapshot tree at t=1 in FIG. 2A.

Block 402 corresponds to root node 202. Because root node 202 includes pointers to intermediate nodes 212 and 214, block 402 includes file offsets to blocks 412 and 414. Blocks 412 and 414 correspond to intermediate nodes 212 and 214, respectively. Because intermediate node 212 includes pointers to leaf nodes 222, 224, and 226, block 412 includes file offsets to blocks 422, 424, and 426. The file offsets correspond to the pointers of a file system metadata snapshot tree. Similarly, block 414 includes file offsets to blocks 428, 430 because intermediate node 214 includes pointers to leaf nodes 228, 230.

Blocks 422, 424, 426, 428, and 430 correspond to the leaf nodes of file system metadata snapshot tree 200 and each include a corresponding file offset to one or more blocks of the file system data stored in file system data 451. For example, block 422 includes an offset to one or more blocks in file system data 451 that store the value of L1. Similarly, blocks 424, 426, 428, 430 include corresponding offsets to one or more blocks in file system data 451 that store the value of L2, L3, L4, and L5, respectively.

FIG. 4B is a block diagram illustrating an embodiment of archive data. In the example shown, archive data 450 may be archived by a storage system, such as secondary storage system 104. In the example shown, archive data 450 includes file system data 453 and a serialized tree data 463.

In the example shown, file system data 453 is an incremental snapshot archive of a file system metadata snapshot tree at time t=2. An incremental snapshot archive may include changes to the data of a file system metadata snapshot tree since a last snapshot archive (e.g., new data or modified data). File system data 453 may be stored as a flat set of data. In some embodiments, file system data 453 stores all data blocks associated with leaf nodes of a snapshot tree that were not previously archived. In some embodiments, file system data 453 stores a plurality of file data blocks in a single block of file system data 453. In some embodiments, the file system data includes file system metadata, such as file size, directory structure, file permissions, physical storage locations of the files, etc.

Serialized tree data 463 is a serialized version of one or more nodes of the file system metadata snapshot tree corresponding to a backup snapshot at time t=2 and is represented as a flat set of data that is comprised of one or more blocks. Each block of the flat set of data corresponds to a node of the snapshot tree. Serialized tree data 463 includes a serialized representation of one or more changes to a file system metadata snapshot tree (e.g., new node, modified node, deleted node) since a previous backup snapshot.

To determine whether a node should be included in a serialized tree data, a file system manager starts at the root node associated with a file system metadata snapshot view and traverses the file system metadata snapshot tree. At each node of the file system metadata snapshot tree, the file system manager determines whether that particular node existed in one or more previous file system metadata snapshot trees. In the event the node didn't exist in the previous file system metadata snapshot tree, a block corresponding to the node is included in serialized tree data. In the event the node is determined to have existed in one or more previous file system metadata snapshot trees, a block corresponding to the node is not included in the serialized tree data because a previous serialized tree data already includes a block corresponding to the node. Instead, a file offset to the block of the previous serialized tree data may be included in one or more of the blocks in the serialized tree data.

For example, to create a snapshot corresponding to a backup snapshot at t=2, root node 204 was added. The snapshot tree corresponding to the backup snapshot at t=2 indicates that the value of "DATA4" has been modified to be "DATA4'." Intermediate node 216 and leaf node 232 were added to the snapshot tree to ensure that each node along this path has a TreeID of "2." In the example shown, serialized tree data 463 corresponds to the new nodes of the file system metadata snapshot tree corresponding to the backup snapshot at t=2. Each block of serialized tree data 463 corresponds to one of the nodes associated with the file system metadata snapshot tree corresponding to the backup snapshot at t=2. For example, blocks 432, 416, 404 correspond to nodes 232, 216, 204, respectively.

In the example shown, block 404 corresponds to root node 204. Because root node 204 includes a pointer to intermediate node 212, block 404 includes a file offset to block 412 of serialized tree data 461. Previously stored serialized tree data 461 already includes block 412 that corresponds to intermediate node 212. A file offset to a previously stored serialized tree data is used to save memory and prevent storing duplicative data. Root node 204 also includes a pointer to intermediate node 216. Similarly, block 404 also includes a file offset to block 416, which corresponds to intermediate node 216.

Intermediate node 216 includes pointers to leaf nodes 230, 232. The value of leaf node 230 has not changed and was previously stored in file system metadata 451. To save memory and prevent storing duplicative data, block 416 includes a file offset to block 430 of serialized tree data 461. Block 416 also includes a file offset to block 432. Block 432 corresponds to leaf node 232. Intermediate node 216 is a new node because tree data structure 200 did not include intermediate node 216. Thus, serialized tree data 463 includes a block that corresponds to intermediate node 216.

Block 432 corresponds to leaf node 232 of tree data structure 250. Leaf node 232 is a new node because tree data structure 200 did not include leaf node 232. Thus, serialized tree data 463 includes a block that corresponds to leaf node 232. Block 432 includes a file offset to one or more blocks in file system data 453 that store the value of leaf node 232.

FIG. 4C is a block diagram illustrating an embodiment of archive data. In the example shown, archive data 480 can be archived by a system, such as secondary storage system 104. In the example shown, archive data 480 includes file system data 455 and a serialized tree data 465.

File system data 455 is an incremental snapshot archive of the file system data stored in or referenced by the one or more leaf nodes of a snapshot tree. For example, file system data 455 may include one or more values of the file system metadata snapshot tree corresponding to a backup snapshot at time t=3 that were not previously archived. File system data 455 may be stored as a flat set of data. In some embodiments, file system data 455 stores all data blocks associated with leaf nodes of a file system metadata snapshot tree that were not previously archived. In some embodiments, file system data 455 stores a plurality of file data blocks in a single block of file system data 455. In some embodiments, the file system data includes file system metadata, such as file size, directory structure, file permissions, physical storage locations of the files, etc.

Serialized tree data 465 is a serialized version of one or more nodes of the snapshot tree corresponding to a backup snapshot at time t=3 and is represented as a flat set of data that is comprised of one or more blocks. To create a file system metadata snapshot tree corresponding to the backup snapshot at t=3, root node 206 was added. The file system metadata snapshot tree corresponding to the backup snapshot at t=3 indicates that the value of "DATA4'" has been modified to be "DATA4'"." Intermediate node 218 and leaf node 234 were added to the file system metadata snapshot tree corresponding to a backup snapshot at t=3 to ensure that each node along this path has a TreeID of "3."

In the example shown, serialized tree data 465 corresponds to new root nodes of the file system metadata snapshot tree corresponding to a third backup snapshot at time t=3. Each block of serialized tree data 465 corresponds to one of the nodes of the file system metadata snapshot tree corresponding to the backup snapshot at time t=3. For example, blocks 434, 418, 406 correspond to nodes 234, 218, 206, respectively.

Block 406 corresponds to root node 206. Because root node 206 includes a pointer to intermediate node 212, block 406 includes a file offset to block 412 of serialized tree data 461. Root node 206 includes a pointer to intermediate node 218. Similarly, block 406 includes a file offset to block 418, which corresponds to intermediate node 218.

Intermediate node 218 includes a pointer to leaf nodes 230, 234. The value of leaf node 230 has not changed and was previously stored in file system metadata 451. To save memory and prevent storing duplicative data, block 418 includes a file offset to block 430 of serialized tree data 461. Block 418 also includes a file offset to block 434. Block 434 corresponds to leaf node 234. Intermediate node 218 is a new node because tree data structure 350 did not include intermediate node 218. Thus, archive data 480 includes a block that corresponds to intermediate node 218.

Block 434 corresponds to leaf node 234 of tree data structure 280. Leaf node 234 is a new node because tree data structure 250 did not include leaf node 234. Thus, archive data 480 includes a block that corresponds to leaf node 234. Block 434 includes a file offset to a block of file system metadata 455 that stores the value of leaf node 234.

Figure 5:
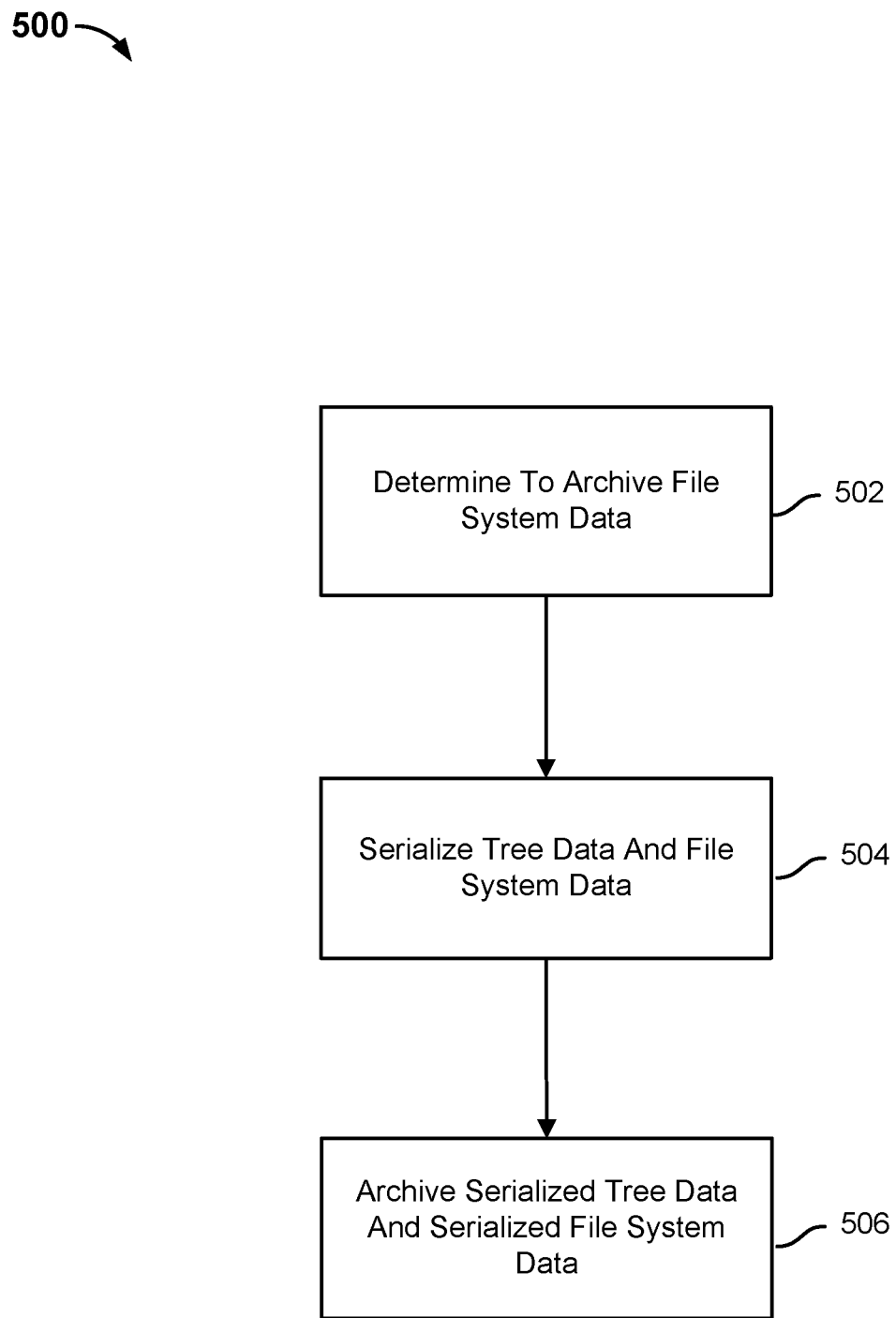
FIG. 5 is a flow chart illustrating an embodiment of a process for archiving data.

FIG. 5 is a flow chart illustrating an embodiment of a process for archiving data. In the example shown, process 500 may be implemented by a storage system, such as secondary storage system 104. In some embodiments, process 500 is used to perform a full snapshot archive. In other embodiments, process 500 is used to perform an incremental snapshot archive.

At 502, is it is determined that file system data is to be archived. A backup snapshot is the state of a system at a particular moment in time. A backup snapshot may be stored locally at a storage system, such as secondary storage system 104. A backup snapshot allows the state of a system to be rolled back to a moment in time for which a snapshot is stored. A system may store a large number of backup snapshots (e.g., thousands, millions). Each backup snapshot may require a significant amount of storage (e.g., GBs, TBs, PBs, etc.). It may be desirable to archive a backup snapshot to a remote storage location, such as cloud object storage 124a. The file system data associated with a backup snapshot may be archived to the remote storage location.

An archive policy may indicate that a full snapshot archive of a snapshot or an incremental snapshot archive of the backup snapshot is to be performed and stored to the remote storage location. A full snapshot archive may include a complete view of one version of a file system metadata snapshot tree and one or more associated file metadata trees for a particular moment in time. A full snapshot archive may include a block corresponding to a root node associated with the view at the particular moment in time and blocks corresponding to any intermediate nodes and/or leaf nodes associated with the root node of the file system metadata snapshot tree as well as blocks corresponding to the nodes associated with the one or more file metadata trees.

An incremental snapshot archive includes a partial view of one version of a file system metadata snapshot tree and one or more associated file metadata trees for a particular moment in time. An incremental snapshot archive may include a block corresponding to a root node associated with the file system metadata snapshot tree and one or more blocks corresponding to nodes that were added for the backup snapshot. The one or more blocks may correspond to nodes of the file system metadata snapshot tree or a file metadata tree.

At 504, a file system metadata snapshot tree and one or more associated file metadata trees for a view are serialized into serialized tree data and file system data associated with the view is serialized into serialized file system data. Serializing the file system metadata snapshot tree and one or more file metadata trees into serialized tree data creates a flat set of data that represents a view corresponding to a backup snapshot. Serializing the file system data into serialized file system data creates a flat set of data that represents the file system data. The file system metadata snapshot tree and the file system data are serialized into flat sets of data because a remote location may be incapable of storing a tree data structure.

The serialized tree data is comprised of one or more blocks. The serialized tree data is a representation of a file system metadata snapshot tree and one or more associated file metadata trees in block form. Each block of the serialized tree data corresponds to a node of a view of a backup snapshot. Instead of a node having one or more pointers to one or more other nodes, a block of the serialized tree may include one or more file offsets to one or more other blocks. The file offsets represent the pointers of a tree data structure. A block may include a file offset to another block in the serialized tree data. A block may include a file offset to another block in a previously serialized tree data. For example, a file system metadata snapshot tree node may include a pointer to a node associated with a previous file system metadata snapshot tree. A block that corresponds to the file system metadata snapshot tree node may include a file offset to the block of a previously serialized tree data block that corresponds to the node associated with the previous file system metadata snapshot tree. The file system metadata snapshot tree node may also include a pointer to a node associated with the current file system metadata snapshot tree. A block that corresponds to the file system metadata snapshot tree node may include a file offset to the block of the current serialized tree data that corresponds to the node associated with the current file system metadata snapshot tree.

The serialized file system data, i.e., a flat set of data, is comprised of one or more blocks. Each block of the serialized file system data corresponds to a data block or data segment of the file system data.

In some embodiments, a full backup snapshot is performed and the serialized tree data includes a plurality of blocks that correspond to the plurality of nodes of the tree data structure corresponding to the full backup snapshot. In other embodiments, an incremental backup snapshot is performed and the serialized tree data includes a plurality of blocks that correspond to the one or more that have been added to a tree data structure since a previous backup snapshot.

At 506, the serialized tree data and serialized file system data are archived. The serialized tree data and serialized file system data may be archived, to a remote location, such as cloud object storage 124a.

Figure 6:
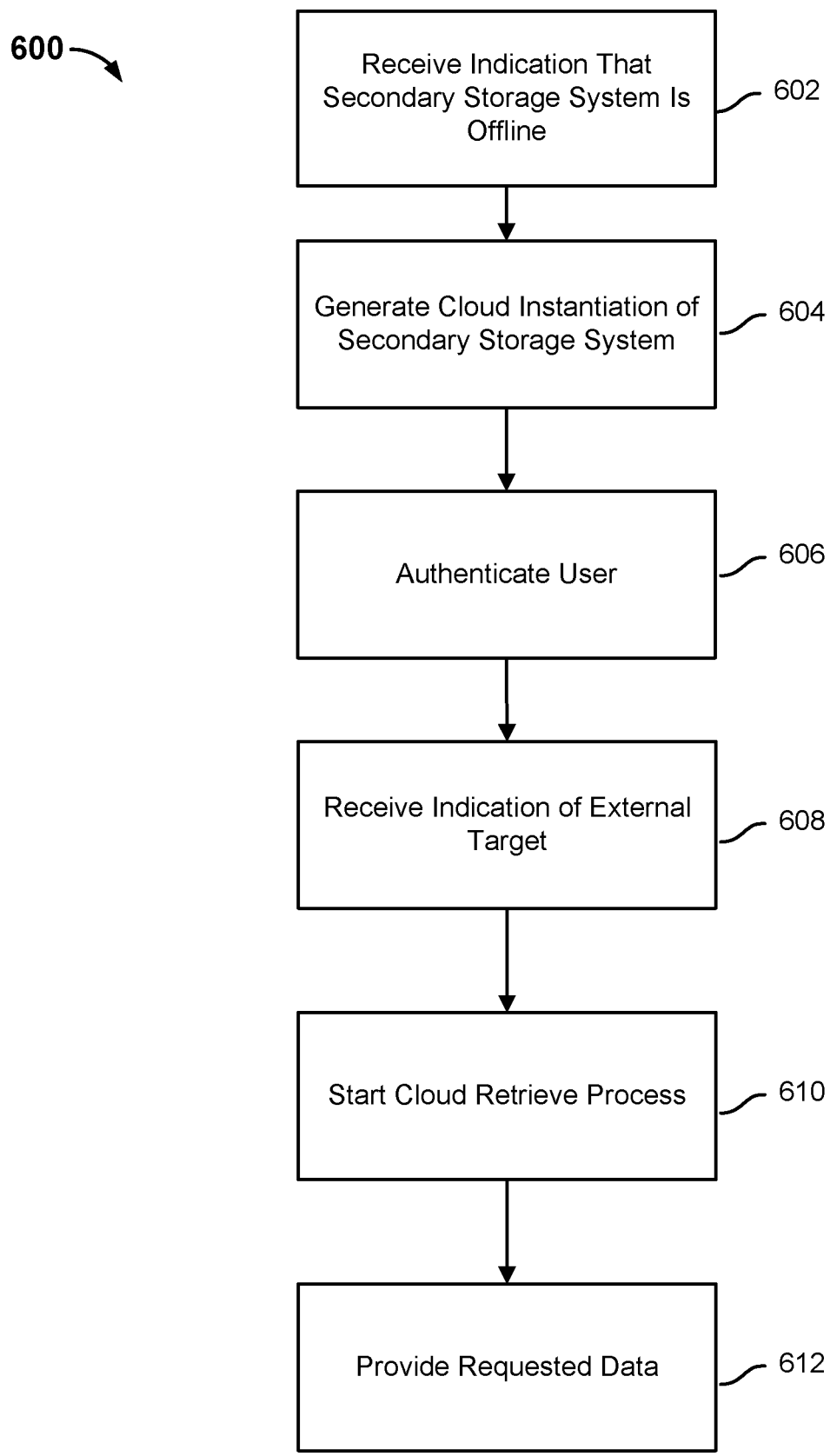
FIG. 6 is a flow chart illustrating an embodiment of a process for restoring data.

FIG. 6 is a flow chart illustrating an embodiment of a process for restoring data. In the example shown, process 600 may be performed by a cloud portal, such as cloud portal 123a.

At 602, an indication that a secondary storage system is offline is received. A secondary storage system may be coupled to a primary system and configured to receive a backup snapshot from the primary system. In response to receiving the backup snapshot, the secondary storage system is configured to store and organize the one or more data blocks of the backup snapshot using a tree data structure. The secondary storage system may be configured to store a plurality of backup snapshots associated with the primary system and to archive to cloud storage the one or more of the backup snapshots A user associated with the primary system may send a request to the secondary storage system. The request may be a request to perform a backup snapshot to the secondary storage system, a request to restore one or more of the stored backup snapshots, a request to generate a cloud instance of a virtual machine backup, etc. The secondary storage system may be unable to satisfy the request.

In the event the secondary storage system is unable to perform the request, the primary system may provide the user an error message indicating that the secondary storage system is unable to perform the request. In response to receiving the error message, a user associated with the primary system may log into the cloud portal to start the cloud instantiation process.

In other embodiments, the secondary storage system may provide a heartbeat signal to the primary system. In the event the primary system does not receive the heartbeat signal within a threshold period, the primary system is configured to provide to a cloud portal an indication that the secondary storage system is offline, which causes the cloud portal to generate a cloud instantiation of the secondary storage system.

At 604, a cloud instantiation of the secondary storage system is generated. A secondary storage system is comprised of a plurality of storage nodes. Each storage node has a particular storage capacity. A cloud portal may provision resources for the cloud instantiation of the secondary storage system. The cloud instantiation of the secondary storage system may correspond to a virtual secondary storage cluster. The virtual secondary storage cluster may be configured to have the same storage capacity as the secondary storage system. For example, a secondary storage system may be comprised of three physical storage nodes, each physical storage node having a storage capacity of 10 TB. The cloud instantiation of the secondary storage system may be comprised of three virtual cloud instances, each virtual cloud instance having a storage capacity of 10 TB. In other embodiments, the virtual secondary storage cluster is configured to have more storage capacity than the secondary storage system. In other embodiments, the virtual secondary storage cluster is configured to have less storage capacity than the secondary storage system. The cloud instantiation of the secondary storage system may be configured for the public cloud (e.g., Amazon Web Services, Microsoft Azure, Google Cloud, etc.) in which the cloud instantiation will reside. A user may specify the public cloud in which the cloud instantiation will reside.

In other embodiments, the virtual secondary storage cluster may be configured to have a user-specified storage capacity. For example, the user may request to have 50 TBs of storage. Each virtual cloud instance may be configured to have a default storage capacity (e.g., 10 TB). In other embodiments, the cloud instantiation of the secondary storage system is configured to have a default storage capacity (e.g., a virtual secondary storage cluster comprised of three virtual cloud instances, each having a storage capacity of 10 TB).

At 606, a user is authenticated. A user associated with the cloud instantiation of the secondary storage system may log into a user interface of the cloud instantiation. A cloud object storage is configured to store a plurality of snapshot archives associated with a plurality of enterprises. An enterprise may be associated with one or more data centers. Each data center may have a corresponding secondary storage system. The corresponding secondary storage systems may be configured to archive corresponding backup snapshots to cloud object storage. A user associated with the enterprise may be permitted to access a snapshot archive and request a snapshot archive to be restored to one of the one or more data centers associated with the enterprise. In other embodiments, the user is associated with only one of the enterprise's data centers. The user may be permitted to access snapshot archives specific to that particular data center and restore to a primary system of the particular data center or the secondary storage system of the particular data center, the snapshot archives specific to that particular data center.

The cloud portal may be configured to request the user to provide a credential that indicates the user is permitted to access the one or more snapshot archives associated with an enterprise. The user's credential may be linked to a subset of the plurality of snapshot archives. For example, the credential of the user associated with a first enterprise is linked to the snapshot archives associated with the first enterprise and the credential of the user associated with a second enterprise is linked to the snapshot archives associated with the second enterprise. Upon authenticating the user, the user may have access to any of the snapshot archives included in the subset of snapshot archives.

At 608, an indication of an external target is received. The external target may correspond to a user destination system that will receive the data associated with a snapshot archive. The user destination system may correspond to a primary system of a data center, a secondary storage system of the data center, or a cloud deployment server. The archive data associated with a secondary storage system may be encrypted. The indication may include a key to decrypt the archive data.

At 610, the cloud retrieve process is started. A list of one or more snapshot archives available to be restored may be presented to a user via a cloud user interface. A request for one or more snapshot archives is received from the user. The request may include an associated destination for the file system data associated with the selected snapshot archive. The request may specify which secondary storage system the user desires to restore (e.g., an enterprise may be associated with a plurality of secondary storage systems, which snapshot archives to restore, a date range associated with a snapshot archive to restore, and a format for the file system data associated with the snapshot archive). The request may specify one or more snapshot archives needed to restore a particular version of a virtual machine.

One or more secondary storage clusters may be virtually rebuilt in the cloud instantiation of the secondary storage system using the one or more snapshot archives requested by the user. Virtually rebuilding a secondary storage cluster includes reconstituting a tree data structure based on the one or more requested snapshot archives.

A snapshot archive may correspond to a backup snapshot that was stored on the secondary storage system and archived to cloud object storage. In other embodiments, the snapshot archive corresponds to a backup snapshot that is not stored on the secondary storage system (e.g., the backup snapshot was stored on the secondary storage system past a retention period, archived to cloud storage, and removed from the secondary storage system). In other embodiments, the snapshot archive includes data associated with a particular version of a virtual machine.

The request for one or more snapshot archives may be for the entire snapshot archive or a portion of the snapshot archive. For example, a user may request to restore an entire snapshot archive to restore the primary system to a particular moment in time. The user may request to restore a portion of the snapshot archive to restore one or more files that are included in the snapshot archive. For example, the user may request to restore a virtual machine container file that is included in one or more snapshot archives.

A snapshot archive is comprised of serialized file system data and serialized tree data. The cloud instantiation of the secondary storage system is configured to reconstitute a snapshot tree associated with the snapshot archive by deserializing the serialized file system data and the serialized tree data and file. The cloud instantiation of the secondary storage system is configured to store the deserialized file system data and the deserialized tree data across the virtual cloud instances (e.g., the file system data is stored in the cloud instantiation of the secondary storage system).

At 612, the requested data is provided to the external target. In some embodiments, the cloud instantiation of the secondary storage system is configured to provide all of the file system data associated with the snapshot archive. In other embodiments, the cloud instantiation of the secondary storage system is configured to provide a portion of the file system data associated with the snapshot archive. For example, a subset of the files (e.g., a particular virtual machine container file) included in the snapshot archive may be requested. The cloud instantiation of the secondary storage system is configured to traverse the reconstituted snapshot tree and to locate the file system data associated with the requested subset of files. Upon location, the cloud instantiation of the secondary storage system may provide the requested data to the primary system associated with the user or to another location, such as a cloud deployment server.

The cloud instantiation of the secondary storage system may be configured to convert the virtual machine included in the snapshot archive from a first virtual machine format to a second virtual machine format that is compatible with the cloud environment in which a cloud deployment server is to be deployed, and deploy the cloud instance of the virtual machine to the cloud deployment server.

Figure 7:
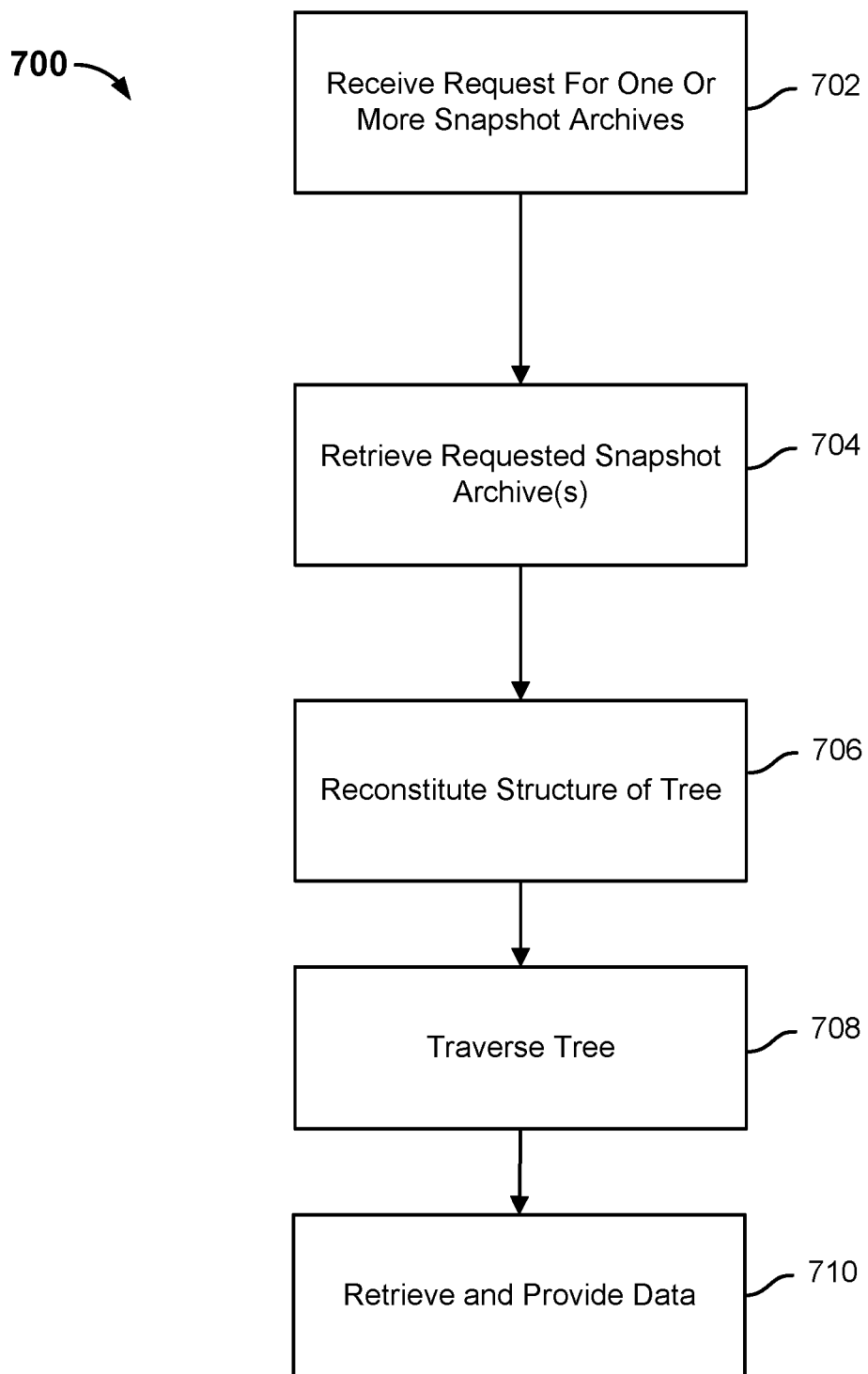
FIG. 7 is a flow chart illustrating an embodiment of a process for restoring archived data.

FIG. 7 is a flow chart illustrating an embodiment of a process for restoring archived data. In the example shown, process 700 may be performed by a storage system, such as a cloud instantiation 122a of secondary storage system 104. Process 700 may be implemented to perform some or all of steps 610, 612 of process 600.

At 702, a request for one or more snapshot archives may be received. A primary system may be configured to send a backup snapshot comprising primary system file system data to a secondary storage system. The backup snapshot is comprised of a plurality of data blocks. In response to receiving the backup snapshot, the secondary storage system may be configured to store the data blocks associated with the backup snapshot and to organize the file system data using a tree data structure, e.g., a snapshot tree. The secondary storage system (e.g., a secondary storage cluster) may be configured to archive a snapshot tree to a remote storage location, such as cloud object storage. A snapshot archive may include serialized file system data and serialized tree data.

In some embodiments, the request for one or more snapshot archives is for a snapshot archive that corresponds to an incremental snapshot archive. For example, a user may desire to restore one or more files associated with a backup snapshot without having to restore all of the file system data associated with a backup snapshot.

In other embodiments, the request for one or more snapshot archives is for a snapshot archive that corresponds to a full snapshot archive. For example, a user may desire to restore the file system of a primary system or other system to a state associated with a full backup snapshot.

In other embodiments, the request for one or more snapshot archives is a snapshot archive that corresponds to an incremental snapshot archive and one or more other snapshot archives. For example, a user may desire to restore a version of a virtual machine container file. The data associated with the version of the virtual machine container file may be stored in a plurality of snapshot archives.

In some embodiments, a request for one snapshot archive causes one or more other snapshot archives associated with the requested snapshot archive to be requested. For example, a snapshot archive that includes a portion of a virtual machine container file is requested, but the data associated with other portions of the virtual machine container file are stored across a plurality of snapshot archives. The one or more other snapshot archives are requested to generate a complete version of the virtual machine container file.

At 704, the one or more requested snapshot archives are retrieved from cloud object storage. A snapshot archive is comprised of serialized file system data and serialized tree data. In some embodiments, an incremental snapshot archive is retrieved. In some embodiments, a full snapshot archive is retrieved. In some embodiments, a full snapshot archive and one or more incremental snapshot archives are retrieved.

At 706, a tree data structure associated with the one or more retrieved snapshot archives is reconstituted. A virtual file manager of the cloud instantiation may virtually rebuild one or more secondary storage systems by reconstituting a tree data structure by deserializing serialized tree data associated with a retrieved snapshot archive. In other embodiments, the tree data structure is reconstituted by deserializing serialized tree data associated with a plurality of snapshot archives. Reconstituting the structure of a tree data structure includes reading the flat set of data associated with the serialized tree data. The flat set of data may include blocks of data that correspond to nodes of a tree data structure and associated file offsets that correspond to pointers of the tree data structure.

For example, for a request associated with snapshot archive 480, the complete tree structure at t=3 may be reproduced based on serialized tree data 465, 463, 461. The virtual file system manager of a cloud instantiation may deserialize the serialized tree data. Root node 206 may be reproduced because serialized tree data 465 includes a block 406 that corresponds to root node 206 of the tree data structure, which includes offsets to blocks associated with intermediate nodes 212, 218.

Intermediate node 212 may be reproduced because block 406 includes an offset to block 412, which corresponds to intermediate node 212. The data associated with intermediate node 212 may be determined from serialized tree data 461.

Intermediate node 218 may be reproduced because block 406 includes an offset to block 418, which corresponds to intermediate node 218. The data associated with intermediate node 218 may be determined from serialized tree data 465.

Leaf node 234 may be reproduced because block 418 includes an offset to block 434, which corresponds to leaf node 234. The value associated with leaf node 234 may be accessed and reproduced because block 434 includes an offset to one or more blocks of data stored in file system data 455.

Leaf nodes 222, 224, 226 may be reproduced because block 406, which corresponds to root node 206, includes an offset to block 412 of serialized tree data 461. Block 412 of serialized tree data 461 corresponds to intermediate node 212. Block 412 includes an offset to blocks 422, 424, 426, which correspond to leaf nodes 222, 224, 226, respectively. The corresponding values associated with leaf nodes 222, 224, 226 may be accessed and reproduced because blocks 422, 424, 426 include file offsets to one or more blocks of data stored in file system data 451.

Leaf node 230 may be reproduced because block 418 of serialized tree data 465 includes an offset to block 430 of serialized tree data 461. Block 430 of serialized tree data 461 corresponds to leaf node 230. The value associated with leaf node 230 may be accessed and reproduced because block 430 includes an offset to one or more blocks of data stored in file system data 451.

In some embodiments, a partial tree data structure is reproduced by deserializing one or more serialized tree data. For example, for the request of a value associated with a data key of "4" at time t=3, a portion of tree data structure 280 may be reproduced based on serialized tree data 465. As seen in FIG. 2E, leaf node 234 has a data key-value pair of "4: DATA4'" and a TreeID of "3." Because a TreeID of "3" is associated with a file system metadata snapshot tree view at t=3, the value stored in leaf node 234, as opposed to the values stored in leaf nodes 228, 232, is the value of a data key "4" at t=3. Although serialized tree data 465 includes file offsets to serialized tree data 463, 461, serialized tree data 461, 463 do not need to be deserialized because the requested value may be determined without deserializing those files. In some embodiments, a subset of the serialized tree data needed to produce the entire snapshot is deserialized to determine the value for a data key at the particular time.

At 708, the reproduced tree data structure is traversed to locate the data associated with a user request. A user may request to restore an entire snapshot archive to restore the primary system to a particular moment in time or the user may request to restore a portion of the snapshot archive to restore one or more files that are included in the snapshot archive. For example, the user may request to restore a version of a virtual machine container file that is included in one or more snapshot archives.

The reproduced tree is traversed based on the one or more data keys associated with the request. For example, for a request for a value associated with a data key of "4" at time t=3, reproduced tree data structure 380 may be traversed from reproduced root node 306 to reproduced intermediate node 318 to reproduced leaf node 334.

At 710, the requested data is retrieved from cloud instantiation of the secondary storage system and provided. For example, for a request for a value associated with a data key of "4" at time t=3, a value of "DATA4'" may be retrieved from the file system data stored in the virtual cloud instances of the cloud instantiation and provided.

In some embodiments, all of the file system data associated with the reproduced file system metadata snapshot tree is provided. In other embodiments, a portion of the file system data associated with the reproduced file system metadata snapshot tree is provided. The cloud instantiation of the secondary storage system may be configured to convert a virtual machine that is included in one or more snapshot archives to a format that is compatible with the cloud environment in which the cloud deployment server is to be deployed, and deploy the cloud instance of the virtual machine to the cloud deployment server.

Figure 8:
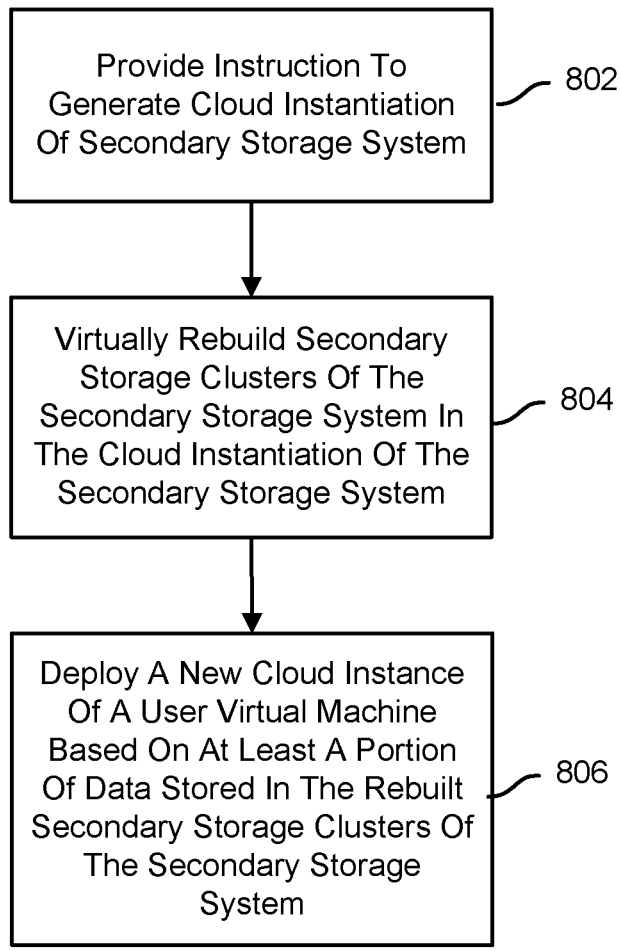
FIG. 8 is a flow chart illustrating an embodiment of a process for deploying a cloud instance of a virtual machine.

FIG. 8 is a flow chart illustrating an embodiment of a process for deploying a cloud instance of a virtual machine. In the example shown, process 800 may be performed by in part by a cloud instantiation of a secondary storage system, such as cloud instantiation 122a of secondary storage system 104.

At 802, an instruction to generate a cloud instantiation of the secondary storage system is provided. The cloud instantiation of secondary storage system may be hosted on a cloud server. The cloud server may receive from a cloud portal an instruction to generate cloud instantiation of a secondary storage system. The cloud server may provide the instruction to an agent running on the cloud server to generate cloud instantiation of secondary storage system.

A secondary storage system is comprised of one or more secondary storage clusters. Each node of the secondary storage cluster has a particular storage capacity. A cloud portal may provision resources for the cloud instantiation of the secondary storage system. The cloud instantiation of the secondary storage system may correspond to a virtual secondary storage cluster. The virtual secondary storage cluster may be configured to have the same storage capacity as the secondary storage system. The virtual secondary storage cluster may be comprised of a plurality of virtual cloud instances, each virtual cloud instance having a particular storage capacity. In other embodiments, the virtual secondary storage cluster has a storage capacity less than the storage capacity of the secondary storage system. In other embodiments, the virtual secondary storage cluster has a storage capacity greater than the storage capacity of the secondary storage system. The cloud instantiation of the secondary storage system may be configured for the cloud environment (e.g., Amazon Web Services, Microsoft Azure, Google Cloud, etc.) in which the cloud instantiation will reside. A user may specify the cloud environment in which the cloud instantiation will reside.

In some embodiments, the cloud instantiation of the secondary storage system is automatically generated when the secondary storage system initially comes online. In other embodiments, the cloud instantiation of the secondary storage system is generated in response to a user request. The request to generate a cloud instantiation of a secondary storage system may be received from a user while the secondary storage system is online. The cloud instantiation of the secondary storage system may be generated as a preventive measure in the event the secondary storage system goes offline. In other embodiments, the cloud instantiation of the secondary storage system generated after the secondary storage system is offline.

In some embodiments, the cloud instantiation of the secondary storage system acts as a backup for the secondary storage system. The cloud instantiation of the secondary storage system may enable a copy of the data stored by the secondary storage system to be accessed while the secondary storage system is offline. In other embodiments, a primary system may be configured to directly send one or more backup snapshots to a cloud instantiation of a secondary storage system without an on-prem secondary storage system.

At 804, one or more secondary storage clusters of the secondary storage system are rebuilt in the cloud instantiation of the secondary storage system.

In some embodiments, the one or more secondary storage clusters of secondary storage system may be rebuilt by building a tree data structure based on one or more snapshot archives received from a cloud object storage. A snapshot archive is comprised of serialized file system data and serialized tree data. The cloud instantiation of the secondary storage system is configured to reconstitute a tree data structure by deserializing the serialized tree data.

In other embodiments, the one or more secondary storage clusters of a secondary storage system may be rebuilt by building a tree data structure based on the file system data included in a secondary storage snapshot. The secondary storage system may provide to the cloud instantiation of the secondary storage system one or more secondary backup snapshots. A secondary backup snapshot may be a replica of a backup snapshot received from a primary system.

An initial secondary storage snapshot may include data that provides a complete view of the file system data associated with a primary system corresponding to a particular moment in time. The initial secondary storage snapshot may be a clone of a tree data structure generated by the secondary storage system.

At 806, a new cloud instance of a user virtual machine is deployed based on at least a portion of data stored in the rebuilt secondary storage clusters of the secondary storage system. The rebuilt tree data structure may include a file metadata tree corresponding to a virtual machine container file. The data associated with the user virtual machine may be located by traversing the rebuilt tree data structure to the leaf nodes associated with the file metadata tree corresponding to the virtual machine container file corresponding to the user virtual machine. The data associated with the user virtual machine file may be associated with a virtual machine format (e.g., VMware) that is not compatible with a virtual machine format associated with a cloud environment in which the cloud instance of the user virtual machine is to be deployed. The user virtual machine file may be converted to the virtual machine format associated with the cloud environment in which the cloud instance of the user virtual machine is to be deployed. The new cloud instance of the user virtual machine may then be deployed to a cloud deployment server hosted in the cloud environment.

Figure 9:
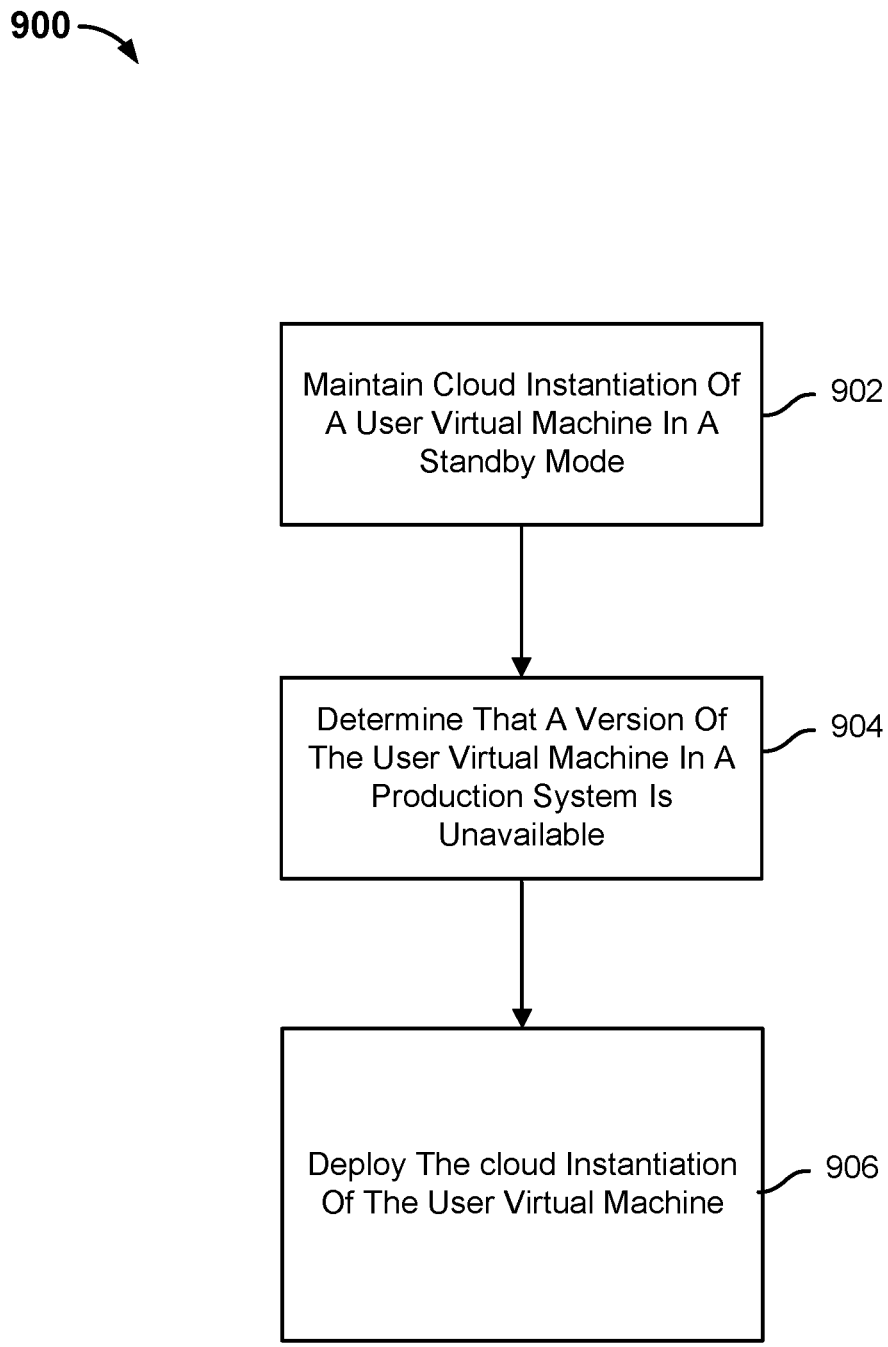
FIG. 9 is a flow chart illustrating an embodiment of a process for deploying a user virtual machine.

FIG. 9 is a flow chart illustrating an embodiment of a process for deploying a user virtual machine. In the example shown, process 900 may be implemented by a cloud deployment server, such as cloud deployment server 126a. Process 900 may be implemented to perform some or all of 806 of process 800.

At 902, a cloud instantiation of a user virtual machine is maintained in a standby mode. A cloud deployment server may be used to maintain the cloud instantiation of the user virtual machine in the standby mode. The cloud instantiation of the user virtual machine is maintained in the standby mode as a backup in case the user virtual machine hosted on a primary system goes offline.

In some embodiments, a cloud instantiation of the user virtual machine is generated according to a backup policy. The backup policy may include a schedule that indicates a frequency at which a cloud instantiation of the virtual machine is to be generated. For example, the cloud instantiation of the user virtual machine may be generated each time the primary system performs a backup snapshot that includes data associated with a version of a user virtual machine to a secondary storage system, on a periodic basis (e.g., hourly, daily, weekly, etc.) or when an amount of data associated with a user virtual machine has changed more than a change threshold amount.

At 904, a version of the user virtual machine in a production system is determined to be unavailable. For example, a user associated with the user virtual machine hosted on a primary system may provide to a cloud deployment server an indication that the production system is offline. In other embodiments, the production system (i.e., the primary system hosting the user virtual machine) is configured to provide a heartbeat signal to the cloud deployment server hosting the cloud instantiation of the user virtual machine. In the event the cloud instantiation of the user virtual machine does not receive the heartbeat signal within a threshold period of time, the user virtual machine in the production system is determined to be offline.

In other embodiments, a user associated with the cloud instantiation of the user virtual machine may provide an indication that a secondary storage system configured to back up the user virtual machine is offline. In other embodiments, the secondary storage system is configured to provide a heartbeat signal to the cloud instantiation of the user virtual machine. In the event the cloud instantiation of the user virtual machine does not receive the heartbeat signal within a threshold period of time, the secondary storage system is determined to be offline.

At 906, the cloud instantiation of the user virtual machine is deployed. The cloud instance of the virtual machine may be maintained in a standby mode in a cloud environment until a deploy condition has been satisfied. Deploying the cloud instantiation of the user virtual machine includes changing a mode of the cloud instance of the user virtual machine from a standby mode to an active mode. For example, a user virtual machine hosted on the primary system (production system) may go offline or the primary system may go offline. In the event the deploy condition has been satisfied, the cloud instance of the virtual machine is deployed (i.e., turned on) and ready to be used by a user associated the user virtual machine within a short period of time (e.g., minutes).

In other embodiments, the secondary storage system is determined to be offline and the cloud instantiation of the user virtual machine is deployed (e.g., turned on) in response to determining the secondary storage system to be offline. This may ensure that a copy of a production system virtual machine is ready to be deployed in the event the user virtual machine in the production system goes offline while the secondary storage system is also offline.

Figure 10A:
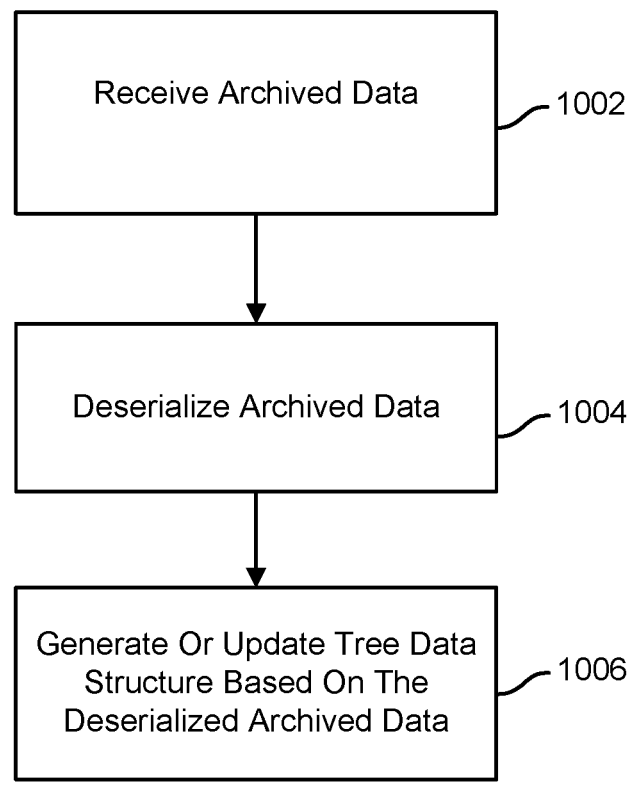
FIG. 10A is a flow chart illustrating an embodiment of a process for rebuilding and maintaining a cloud instantiation of a secondary storage system.

FIG. 10A is a flow chart illustrating an embodiment of a process for rebuilding and maintaining a cloud instantiation of a secondary storage system. In the example shown, process 1000 may be performed by a cloud instantiation of a secondary storage system, such as cloud instantiation 122a of secondary storage system 104. In some embodiments, process 1000 is implemented to perform some or all of step 804 of process 800.

At 1002, archived data is received. The archived data may be a snapshot archive retrieved from cloud object storage. A snapshot archive is a serialized data file comprised of serialized file system data and serialized tree data.

At 1004, the archived data is deserialized. The cloud instantiation of the secondary storage system may be configured to reconstitute tree data structure associated with the archived data by deserializing the serialized data file. Deserializing is a process by which a flat set of data is read to reconstitute a tree data structure. The cloud instantiation of the secondary storage system is configured to store the file system data and the deserialized tree data across the virtual cloud instances (e.g., the file system data is stored in the cloud instantiation of the secondary storage system).

Figure 10B:
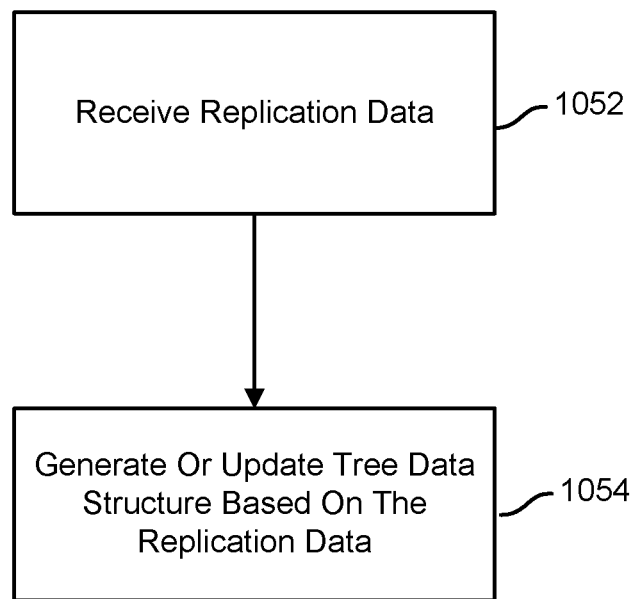
FIG. 10B is a flow chart illustrating an embodiment of a process for rebuilding and maintaining a cloud instantiation of a secondary storage system.

At 1006, a tree data structure is generated or updated based on the deserialized archived data. The tree data structure may provide a partial or complete view of the file system data corresponding to a snapshot archive FIG. 10B is a flow chart illustrating an embodiment of a process for rebuilding and maintaining a cloud instantiation of a secondary storage system. In the example shown, process 1050 may be performed by a cloud instantiation of a secondary storage system, such as cloud instantiation 122a of secondary storage system 104. In some embodiments, process 1000 is implemented to perform some or all of step 804 of process 800.

At 1052, replication data is received. The replication data, i.e., a secondary storage snapshot, may be a replica of a backup snapshot that is received at a secondary storage system from a primary system.

At 1054, a tree data structure is generated or updated based on the replication data. The tree data structure may provide a partial or complete view of the file system data corresponding to the replication data. The view of the file system data corresponding to the replication data may be comprised of a file system metadata snapshot tree and one or more file metadata trees.

Figure 11:
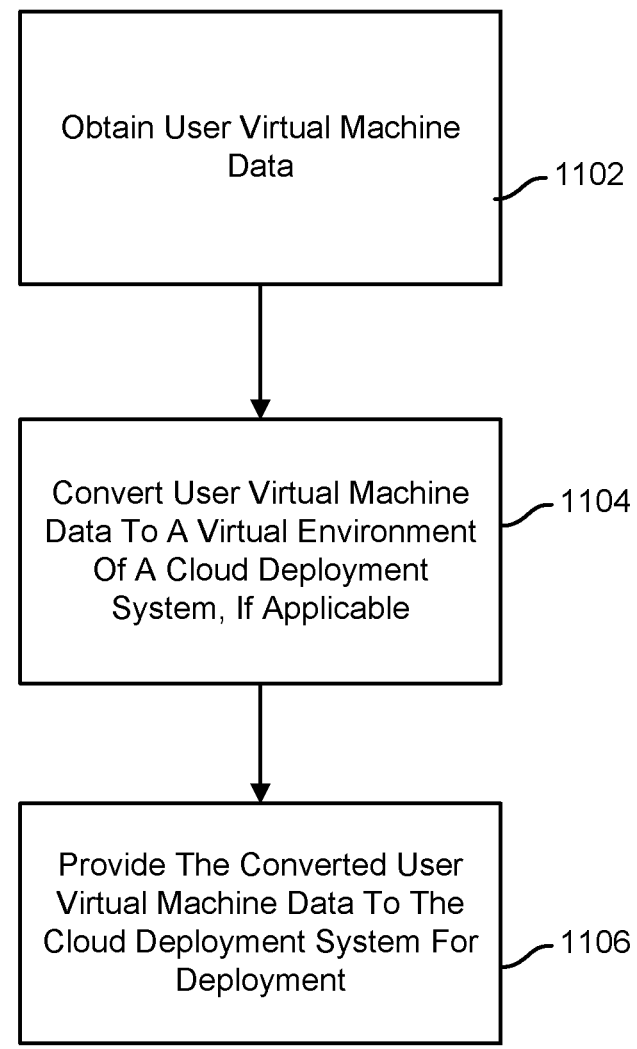
FIG. 11 is a flow chart illustrating an embodiment of a process for deploying a user virtual machine.

FIG. 11 is a flow chart illustrating an embodiment of a process for deploying a user virtual machine. In the example shown, process 1100 may be performed by a cloud instantiation of a secondary storage system, such as cloud instantiation 122a of secondary storage system 104. In some embodiments, process 1100 is implemented to perform some or all of step 612 of process 600. In some embodiments, process 1100 is implemented to perform some or all of step 806 of process 800.

At 1102, user virtual machine data is obtained. In some embodiments, user virtual machine data is obtained at a secondary storage system from a primary system hosting a virtual machine. In other embodiments, user virtual machine data is obtained at a cloud instantiation of a secondary storage system from a primary system hosting a virtual machine. In other embodiments, user virtual machine data is obtained at a cloud instantiation of a secondary storage system from a cloud object storage storing an archived version of the user virtual machine.

At 1104, user virtual machine data is converted to a virtual environment of a cloud deployment, if applicable. The user virtual machine data may be associated with a first virtual machine format (e.g., VMware). The first virtual machine format may be not be compatible with a virtual machine format associated with the virtual environment of a cloud deployment. The user virtual machine data may be converted from the first virtual machine format into a virtual machine format that is compatible with the virtual environment of the cloud deployment (e.g., Amazon Web Services, Microsoft Azure, Google Cloud, etc.).

At 1106, the converted user virtual machine data is provided to the cloud deployment system for deployment. The converted user virtual machine data may be provided to a cloud deployment server hosted in a cloud environment.

Figure 12:
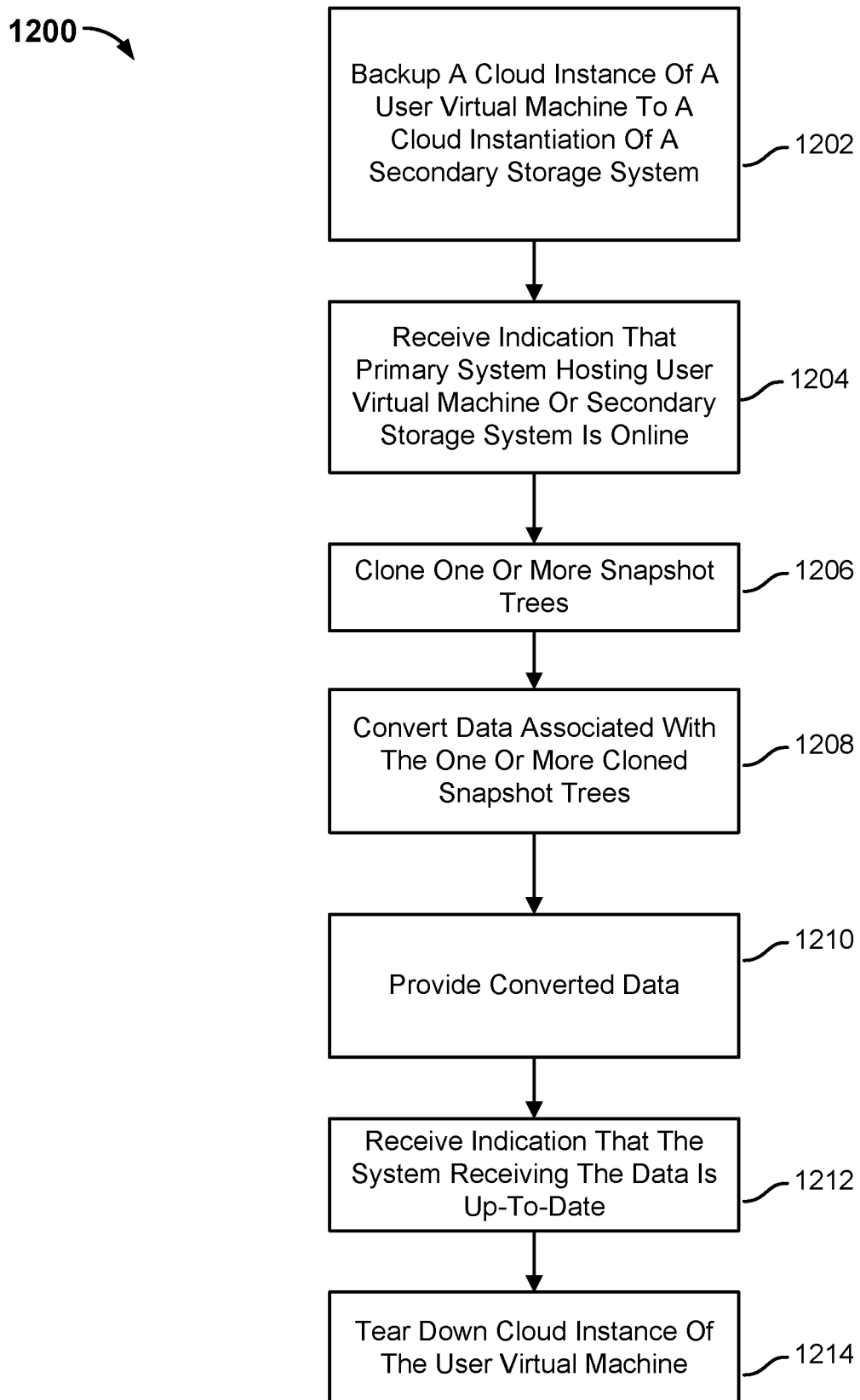
FIG. 12 is a flow chart illustrating an embodiment of a process for tearing down a cloud instance of a user virtual machine.

FIG. 12 is a flow chart illustrating an embodiment of a process for tearing down a cloud instance of a user virtual machine. In the example shown, process 1200 may be performed by a cloud instantiation of a secondary storage system, such as cloud instantiation 122a of secondary storage system 104.

At 1202, a cloud instance of a user virtual machine is backed up to a cloud instantiation of a secondary storage system. A datacenter comprising a primary system that hoses the user virtual machine, and a secondary storage system may be offline. The cloud instance of the user virtual machine may be deployed while the primary system and/or the secondary storage system is offline. In some embodiments, the cloud instance of the user virtual machine is deployed and configured to back up its data to the cloud instantiation of the secondary storage system. For example, the cloud instance of the user virtual machine may be configured to perform a backup snapshot of its file system data and to send the backup snapshot to the cloud instantiation of the secondary storage system.

At 1204, an indication is received that the primary system hosting the user virtual machine or the secondary storage system is online. For example, a user associated with the primary system or a user associated with a secondary storage system may provide the indication. In other embodiments, the cloud instantiation of the secondary storage system may receive a heartbeat signal from the primary system or from the secondary storage system.

At 1206, one or more snapshot trees are cloned. The one or more snapshot trees may correspond to one or more backup snapshots received from the cloud instance of the user virtual machine while the secondary storage system is offline. The one or more snapshot trees may be cloned by copying a corresponding root node associated with the one or more snapshot trees. The corresponding root node copy includes the same set of pointers as a copied root node, but may include a different nodeID and view identifier.

At 1208, data associated with the one or more cloned snapshot trees is converted. The data associated with the one or more cloned snapshot trees may include data of a cloud virtual machine. A format of the cloud virtual machine may be different than a format of a virtual machine in a datacenter. The data of the cloud virtual format may be converted into a format of the primary system virtual machine. For example, the cloud virtual machine may have an associated disk with one or more associated volumes. The data included in the volumes may be converted into one or more virtual machine files in a format associated with the primary machine virtual machine.

In some embodiments, information associated with the virtual machine is unknown. The cloud virtual machine may be converted into a virtual machine format associated with the primary system, but include the same or a different number of disks, and include the same number of volumes as the cloud virtual machine. For example, the cloud virtual machine may include two disks and four volumes and the primary system virtual machine may include two disks and four volumes. In another example, the cloud virtual machine may include four disks and four volumes. The primary system virtual machine may include two disks and four volumes.

Other configurations that may be different between the cloud virtual machine and the primary system virtual machine may include the number of cores, memory size, network interface card speed, and/or IP address.

At 1210, the converted data is provided. In some embodiments, the converted data is provided to the primary system hosting the user virtual machine. In response to receiving the converted data, the primary system may be configured to restore the user virtual machine.

In other embodiments, the converted data is provided to the secondary storage system. In response to receiving the converted data, the secondary storage system may update its own tree data structures based on the converted data. The secondary storage system may then be used to restore the user virtual machine running on the primary system.

At 1212, an indication is received that the system receiving the data is up-to-date. The cloud instantiation of the secondary storage system may receive from the secondary storage system a notification that the secondary storage system is finished updating its tree data structure based on the converted data. In other embodiments, the cloud instantiation of the secondary storage system receives from the primary system hosting the user virtual machine a notification that the user virtual machine hosted on the primary system is up-to-date.

At 1214, the cloud instance of the user virtual machine is torn down.

Figure 13:
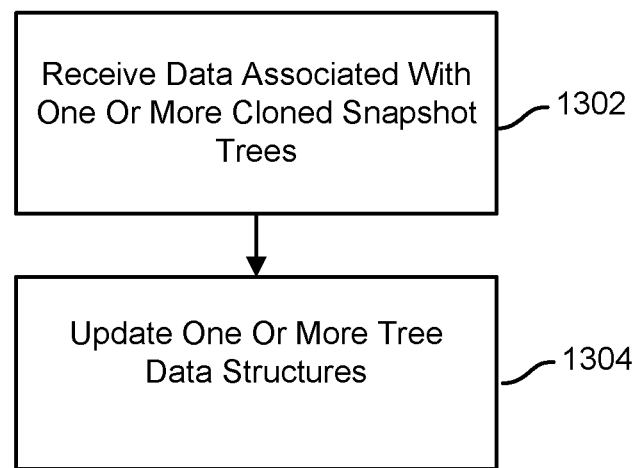
FIG. 13 is a flow chart illustrating an embodiment of a process for updating a secondary storage system.

FIG. 13 is a flow chart illustrating an embodiment of a process for updating a secondary storage system. In the example shown, process 1300 may be performed by a secondary storage system, such as secondary storage system 104.

At 1302, the data associated with one or more cloned snapshot trees is received. The data associated with one or more cloned snapshot trees may include the file system data included in one or more backup snapshots received by a cloud instantiation of a secondary storage system while the secondary storage system was offline.

At 1304, one or more tree data structures are updated based on the received data associated with one or more cloned snapshot trees. The data associated with one or more cloned snapshot trees may include file system data. The secondary storage system may organize the file system data of a backup snapshot using a tree data structure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining that a user virtual machine hosted on a primary system is offline and a secondary storage system is offline, wherein the secondary storage system is configured to backup to the primary system;
    providing an instruction to generate a cloud instantiation of the secondary storage system;
    virtually rebuilding, in the cloud instantiation of the secondary storage system, one or more secondary storage clusters, wherein virtually rebuilding, in the cloud instantiation of the secondary storage system, one or more secondary storage clusters comprises generating a first tree data structure based on a first set of data that is deserialized from a serialized version of the first set of data, wherein the serialized version of the first set of data is obtained from a cloud archive;
    deploying from the cloud instantiation of the secondary storage system to a cloud deployment server a new cloud instance of the user virtual machine based on at least a portion of the first set of data stored in the one or more rebuilt secondary storage clusters of the cloud instantiation of the secondary storage system including by providing a version of at least the portion of the first set of data of the one or more rebuilt secondary storage clusters to the cloud deployment server;
    backing up the new cloud instance of the user virtual machine to the cloud instantiation of the secondary storage system, wherein the backed up data is organized using a second tree data structure, wherein one or more nodes of the second tree data structure are linked to one or more nodes of the first tree data structure;
    receiving an indication that the secondary storage system is online;
    in response to receiving the indication that the secondary storage system is online:
        cloning the second tree data structure; and
        converting virtual machine data included in the cloned second tree data structure from a first virtual machine format associated with a cloud environment in which the new cloud instance of the user virtual machine is deployed into a second virtual machine format associated with the primary system; and
        providing the converted virtual machine data from the cloud instantiation of the secondary storage system to the secondary storage system.

2. The method of claim 1, wherein the cloud archive is located in a cloud object storage.

3. The method of claim 1, wherein the cloud archived received the serialized version of the first set of data from the secondary storage system.

4. The method of claim 1, further comprising:
    receiving a second set of data from the cloud archive; and
    updating the first tree data structure based on the second set of data.

5. The method of claim 1, further comprising maintaining the new cloud instance of the user virtual machine in a standby mode.

6. The method of claim 5, further comprising determining that a production system hosting a version of the user virtual machine is unavailable, wherein the new cloud instance of the user virtual machine is deployed in response to determining that the production system hosting the version of the user virtual machine is unavailable.

7. The method of claim 6, further comprising responsive to receiving from a user associated with the production system, an indication that the production system hosting the version of the user virtual machine is unavailable, deploying the new cloud instance of the user virtual machine.

8. The method of claim 6, wherein the production system is configured to provide to the cloud instantiation of the secondary storage system a heartbeat signal, wherein in the event the heartbeat signal is not received within a threshold period of time, the production system hosting the version of the user virtual machine is determined to be unavailable.

9. The method of claim 5, wherein deploying the new cloud instance of the user virtual machine includes changing a mode of the new cloud instance of the user virtual machine from the standby mode to an active mode.

10. The method of claim 1, wherein the new cloud instance of the user virtual machine is generated according to a backup policy, wherein the backup policy indicates a frequency at which a corresponding cloud instance of the user virtual machine is to be generated.

11. The method of claim 1, wherein the cloud instantiation of the secondary storage system is configured to receive from the secondary storage system an indication that the secondary storage system is up-to-date, wherein the new cloud instance of the user virtual machine is torn down in response to receiving the indication that the secondary storage system is up-to-date.

12. The method of claim 1, wherein the serialized version of the first set of data includes a plurality of data blocks, wherein the plurality of data blocks at least includes a first data block that corresponds to a root node of the first tree data structure, a second data block that corresponds to an intermediate node of the first tree data structure, and a third data block that corresponds to a leaf node of the first tree data structure.

13. A system, comprising:
    a processor configured to:
        determine that a user virtual machine hosted on a primary system is offline and a secondary storage system is offline, wherein the secondary storage system is configured to backup to the primary system;
        provide an instruction to generate a cloud instantiation of the secondary storage system;
        virtually rebuild, in the cloud instantiation of the secondary storage system, one or more secondary storage clusters, wherein to virtually rebuilding, in the cloud instantiation of the secondary storage system, one or more secondary storage clusters, the processor is configured to generate a first tree data structure based on a first set of data that is deserialized from a serialized version of the first set of data, wherein the serialized version of the first set of data is obtained from a cloud archive; and
        deploy from the cloud instantiation of the secondary storage system to a cloud deployment server a new cloud instance of the user virtual machine based on at least a portion of the first set of data stored in the one or more rebuilt secondary storage clusters of the cloud instantiation of the secondary storage system, wherein to deploy the new cloud instance of the user virtual machine, the processor is further configured to provide a version of at least the portion of the first set of data of the one or more rebuilt secondary storage clusters to the cloud deployment server;
        back up the new cloud instance of the user virtual machine to the cloud instantiation of the secondary storage system, wherein the backed up data is organized using a second tree data structure, wherein one or more nodes of the second tree data structure are linked to one or more nodes of the first tree data structure;
receive an indication that the secondary storage system is online;
in response to receiving the indication that the secondary storage system is online:
clone the second tree data structure; and
convert virtual machine data included in the cloned second tree data structure from a first virtual machine format associated with a cloud environment in which the new cloud instance of the user virtual machine is deployed into a second virtual machine format associated with the primary system; and
provide the converted virtual machine data from the cloud instantiation of the secondary storage system to the secondary storage system; and
a memory coupled to the processor and configured to provide the processor with instructions.

14. A computer program product, the computer program product being embodied in a non-transitory computer readable storage medium and comprising computer instructions for:
determining that a user virtual machine hosted on a primary system is offline and a secondary storage system is offline, wherein the secondary storage system is configured to backup to the primary system;
providing an instruction to generate a cloud instantiation of the secondary storage system;
virtually rebuilding, in the cloud instantiation of the secondary storage system, one or more secondary storage clusters, wherein virtually rebuilding, in the cloud instantiation of the secondary storage system, one or more secondary storage clusters comprises generating a first tree data structure based on a first set of data that is deserialized from a serialized version of the first set of data, wherein the serialized version of the first set of data is obtained from a cloud archive;
deploying from the cloud instantiation of the secondary storage system to a cloud deployment server a new cloud instance of the user virtual machine based on at least a portion of the first set of data stored in the one or more rebuilt secondary storage clusters of the cloud instantiation of the secondary storage system including by providing a version of at least the portion of the first set of data of the one or more rebuilt secondary storage clusters to the cloud deployment server;
backing up the new cloud instance of the user virtual machine to the cloud instantiation of the secondary storage system, wherein the backed up data is organized using a second tree data structure, wherein one or more nodes of the second tree data structure are linked to one or more nodes of the first tree data structure;
receiving an indication that the secondary storage system is online;
in response to receiving the indication that the secondary storage system is online:
cloning the second tree data structure; and
converting virtual machine data included in the cloned second tree data structure from a first virtual machine format associated with a cloud environment in which the new cloud instance of the user virtual machine is deployed into a second virtual machine format associated with the primary system; and
providing the converted virtual machine data from the cloud instantiation of the secondary storage system to the secondary storage system.

* * * * *